United States Patent [19]
Wasilewski et al.

[11] Patent Number: 5,870,474
[45] Date of Patent: Feb. 9, 1999

[54] METHOD AND APPARATUS FOR PROVIDING CONDITIONAL ACCESS IN CONNECTION-ORIENTED, INTERACTIVE NETWORKS WITH A MULTIPLICITY OF SERVICE PROVIDERS

[75] Inventors: Anthony John Wasilewski, Alpharetta; Douglas F. Woodhead, Lawrenceville; Gary Lee Logston, Tucker, all of Ga.

[73] Assignee: Scientific-Atlanta, Inc., Norcross, Ga.

[21] Appl. No.: 580,759

[22] Filed: Dec. 29, 1995

Related U.S. Application Data

[60] Provisional application No. 60/007,962 Dec. 4, 1995.
[51] Int. Cl.$^6$ .................................. H04L 9/00; H04K 1/00
[52] U.S. Cl. .................................. 380/21; 380/23; 380/25; 380/49
[58] Field of Search .................................. 380/21, 23, 25, 380/49

[56] References Cited

U.S. PATENT DOCUMENTS

| | | | |
|---|---|---|---|
| 33,189 | 3/1861 | Lee et al. | 380/20 |
| 4,405,829 | 9/1983 | Rivest et al. | 380/30 |
| 4,531,020 | 7/1985 | Wechselberger et al. | 178/22.08 |
| 4,613,901 | 9/1986 | Gilhousen et al. | 358/122 |
| 4,634,807 | 1/1987 | Chorley et al. | 380/4 |
| 4,912,762 | 3/1990 | Lee et al. | 380/24 |
| 5,029,207 | 7/1991 | Gammie | 380/10 |
| 5,124,117 | 6/1992 | Tatebayashi et al. | 380/21 |
| 5,237,610 | 8/1993 | Gammie | 380/10 |
| 5,341,525 | 8/1994 | Wasilewski et al. | 380/20 |
| 5,381,481 | 1/1995 | Gammie et al. | 380/49 |
| 5,400,401 | 3/1995 | Wasilewski et al. | 380/9 |
| 5,420,866 | 5/1995 | Wasilewski | 370/110.1 |
| 5,473,692 | 12/1995 | Davis | 380/25 |
| 5,481,542 | 1/1996 | Logston et al. | 370/94.2 |
| 5,481,613 | 1/1996 | Ford et al. | 380/30 |
| 5,557,678 | 9/1996 | Ganesan | 380/21 |

(List continued on next page.)

OTHER PUBLICATIONS

Diffle, et al, "Authentication and Authenticated Key Exchanges," Designs, Codes and Cryptography 2,107–125 (1992).
Bruce Schneier, "Applied Cryptography," 357–363 (1995).
Menezes et al, "Handbook of Applied Cryptography," 506–525 (1996).
MPEG Systems International Standards Reference (ISO/IEC JTC1/SC29/WG11 NO801, Nov., 1994, ISO Reference No. 13818–1.
Wasilewski, A., "Universal Multi–Program Multiplex and Transport for MPEG–2 Systems", International Organization for Standardization, ISO/IEC JTC1/SC29/WG11 MPEG 93/170, (Jan. 1993).
Wasilewski, A., An MPEG–2 Multi–Program Multiplex Syntax International Organization for Standardization, ISO/IEC JTC1/SC29/WG11 MPEG 93/170, (Jan. 1994).

(List continued on next page.)

*Primary Examiner*—Thomas H. Tarcza
*Assistant Examiner*—Hrayr A. Sayadian
*Attorney, Agent, or Firm*—Kenneth M. Massaroni; Kelly A. Gardner; Hubert J. Barnhardt, III

[57] ABSTRACT

A control system provides secure transmission of programs, including at least one of video, audio, and data, between a service provider and a customer's set top unit over a digital network. Program bearing data packets are recieved in a first network protocol over a first data link and removed from the first network protocol. Packets representing a particular program requested by a customer having a set top unit are selected. Conditional access is provided to the selected program. In particular, program bearing packets are encrypted according to a first encryption algorithm using a first key, which is then encrypted according to a second encryption algorithm using a second key. The first keys are transported in packets to the customer's set top units along with the program packets. A public key cryptographic technique encrypts the second key such that the public key used in the encryption corresponds to the private key of the customer's set top unit. After the conditional access layers have been added, the packets are encapsulated and output in a second network protocol destined for the set top unit.

50 Claims, 17 Drawing Sheets

U.S. PATENT DOCUMENTS

| | | | |
|---|---|---|---|
| 5,557,765 | 9/1996 | Lipner et al. | 380/21 |
| 5,559,889 | 9/1996 | Easter et al. | 380/30 |
| 5,563,950 | 10/1996 | Easter et al. | 380/30 |
| 5,568,552 | 10/1996 | Davis | 380/4 |
| 5,583,939 | 12/1996 | Chang et al. | 380/21 |

OTHER PUBLICATIONS

Wasilewski, A., "Requirements and Method for High–Level Multiplexing of MPEG and Other Digital Service Citstreams with Universal Transport Layer", International Organization for Standardization, ISO/IEC JTC1/SC2/WG11 MPEG 92/754, (Nov., 1992).

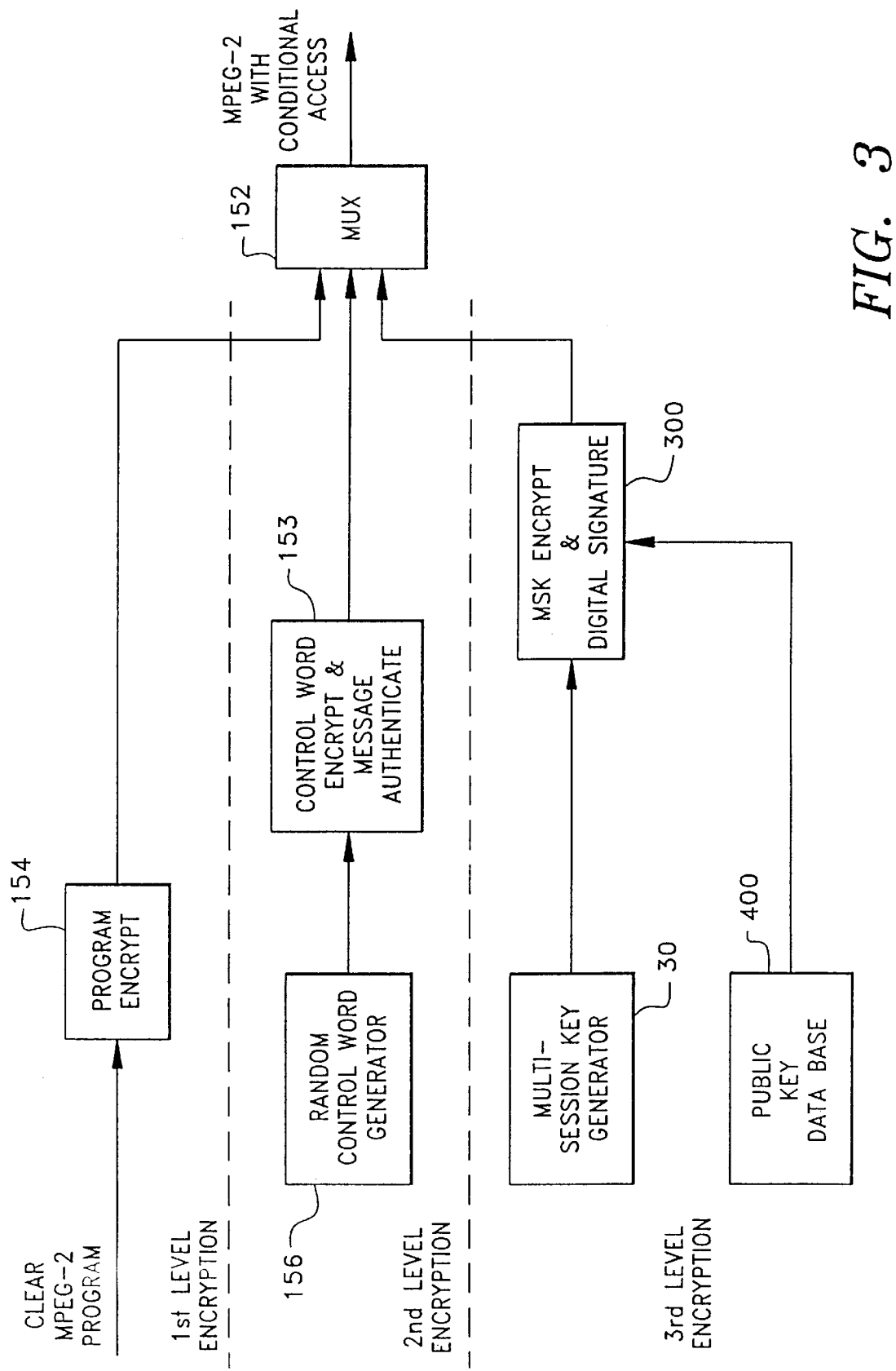

| A1 | A1 | A1 | A2 | A2 | A2 | C1 | C1 | C1 |
|----|----|----|----|----|----|----|----|----|
| B1 | 00 | 00 | E1 | 00 | 00 | F1 | 00 | 00 |
| D1 | 00 | 00 | D2 | 00 | 00 | D3 | 00 | 00 |
| H1 | H1* | H1* | H2 | H2* | H2* | H3 | H3 | H3 |
| B2 | B2 | B2 | K1 | 00 | 00 | K2 | 00 | 00 |
| D4 | 00 | 00 | D5 | 00 | 00 | D6 | 00 | 00 |
| D7 | 00 | 00 | D8 | 00 | 00 | D9 | 00 | 00 |
| D10| 00 | 00 | D11| 00 | 00 | D12| 00 | 00 |
| Z1 | Z1 | Z1 | Z2 | Z2 | Z2 | Z2 | 00 | 00 |

STS-3C TRANSPORT OVERHEAD

*FIG. 9*

SPE FOR MPEG-2 SYSTEMS TRANSPORT PACKET SUPER SERVICE

METHOD AND APPARATUS FOR PROVIDING CONDITIONAL ACCESS IN CONNECTION-ORIENTED, INTERACTIVE NETWORKS WITH A MULTIPLICITY OF SERVICE PROVIDERS

CROSS-REFERENCE TO RELATED APPLICATIONS

This application claims priority of earlier filed U.S. provisional application Ser. No. 60/007,962, filed Dec. 4, 1995, entitled "An Apparatus for Providing Conditional Access in Connection-Oriented, Interactive Networks With a Multiplicity of Service Providers."

FIELD OF THE INVENTION

The present invention relates to a control system for providing interactive information services, such as video, audio, library, interactive games, and the like over a digital network. Particular video applications include "movie on demand," on-line data retrieval, and home shopping. More particularly, the invention relates to a control system for providing secure transmission of these information services between a service provider and a customer's set top unit over a digital network.

BACKGROUND OF THE INVENTION

Recent advances in digital signal processing techniques and, in particular, advancements in digital compression techniques, have led to an abundance of proposals for providing new digital services to the customer's home via existing telephone and coaxial cable lines. For example, proposals have been made to provide hundreds of CATV channels to customers by compressing digital video, transmitting the compressed digital video over conventional coaxial CATV cables, and then decompressing the video at the customer's set top unit. Another proposed application of this technology is a "movie on demand" video system in which a customer communicates directly with a video service provider via the telephone lines or coaxial CATV cables to request a particular video program from a video library, and the requested video program is routed to the caller's home via the telephone lines or via the coaxial CATV cables for immediate viewing.

Such an exemplary system typically has three distinct segments: (1) a service provider (SP), which provides the video, audio, interactive games and the like (collectively referred to hereinafter as "programs") to the system; (2) a customer, who purchases the programs from the service provider; and, (3) a network operator, which provides a transmission path or connection between the SP and the customer for delivery of the programs. A layer of complexity is added to the operation and design of the system if the network operator is defined as a telephone company by the Federal Communications Commission (FCC). In such a case, the network operator is subject to regulation under the jurisdiction of the FCC. The system will then be further categorized into Level 1 services (L1) and Level 2 services (L2). Level 1 services provide the information session connection and define the portion of the system responsible for setting up and maintaining interactive communication sessions between customers and SPs. Level 1 services are provided by the network operator and are regulated by the FCC. Level 2 services, on the other hand, define the portion of the system responsible for providing the programs requested to the L1 portion of the system from the SP and for terminating the service at the customer end of the network. A provider of Level 2 services is defined by the FCC as an enhanced services provider and is not regulated by the FCC. Significantly, these FCC regulations limit the control a Level 1 services provider may have over Level 2 services.

In a Level 1/Level 2 system, which is under the jurisdiction of the FCC, the SP resides in Level 2 and the control that the SP can exercise over Level 1 services is restricted. However, in any system where a SP is delivering programs to a customer over a network, the SP has a need to prevent the unauthorized access to the programs provided to the customer. For example, a nonsubscriber may attempt to illegitimately receive the programs intended for the use of paying subscribers. This protection of programs through the prevention of unauthorized access is referred to as "conditional access." As used herein the terms "conditional access" and "conditional access layer" broadly refer to the control mechanisms, data structures and commands that provide for selective access or denial of specific services. Prior art systems have provided conditional access by encrypting the programs at the SP site and decrypting the programs at the customer site.

For example, Lee et al., U.S. Pat. No. Re. 33,189, discloses a system using an encryption mechanism for providing conditional access in a satellite television system and is hereby incorporated by reference. In Lee, a program is scrambled at a SP site using a frequently changing random number. The random numbers are encrypted with a key and broadcast along with the program to customer sites. Customers who have paid receive the key, encrypted with the unique ID that is embedded in their set top unit (STU). These customers' STUs can decrypt the key using the unique ID embedded therein. The customers' STU can then decrypt the encrypted random numbers, as they are broadcast, and use the random numbers, along with the key, to decrypt the program. As noted above, the key in the Lee invention must be securely transmitted; otherwise, an unauthorized user could get access to the key and gain access to the broadcast programs. Lee protects the key by using the unique ID of the STU to encrypt it. Such a technique works fine in a broadcast environment where there is a single broadcaster to multiple users. In that environment, the broadcaster can take adequate measures to protect the list of valid customer STU IDs. However, in a telephone architecture regulated by the FCC, as described above, multiple service providers (i.e., broadcasters) must have access to the multiple users. In such an environment, the list of unique STU IDs is vulnerable to discovery by unauthorized parties, and the security of the system may be breached. Additionally the Lee system is appropriate for a broadcast environment in which the SPs have the only reasonable means to address the STUs. Therefore, the system is not susceptible to compromise by unauthorized users addressing the STUs. However, in a digital network environment where STUs are uniquely addressable, and multiple SPs have access to multiple STUs, an unauthorized user could put information on the network addressed to individual STUs and thereby compromise the system. Applicants have recognized that a conditional access system in a digital network environment must have a mechanism that allows the STU to authenticate the identity of the SP. Thus, applicants have recognized that an improved encryption technique is needed.

Moreover, while encryption has provided conditional access, the problem of where to perform the conditional access in an FCC regulated system remains unresolved. Applicants have recognized that a solution that performs the conditional access within the L1 portion of the system is unnecessarily complicated by FCC regulation.

Applicants have recognized that conditional access should be performed while a program is still in control of the Level 2 service provider, i.e., before it is delivered to the L1 portion of the system. Access to the program and vital conditional access information can be closely controlled by a service provider. Unfortunately, the file server equipment currently available to service providers does not provide the necessary functionality to perform conditional access before a program is output from the file server. As a result, there is a need for method and apparatus to provide conditional access to a program after it exits a file server, but before it enters the L1 portion of the system.

The problem is complicated further when considered in the context of a typical digital network environment. In such an environment it is expected that the SPs will store programs on file servers in the form of Moving Picture Expert Group (MPEG-2) Systems transport packets, as defined in MPEG-2 Systems International Standards Reference (ISO/IEC JTC1/SC29/WG11 N0801, November 1994, ISO Reference No. 13818-1), which is hereby incorporated by reference. Importantly, although the MPEG-2 Systems International Standards Reference does not standardize on a particular method of conditional access, it does contemplate the addition of conditional access to the MPEG-2 transport packets. Thus, to conform to the MPEG-2 standard, it is necessary that conditional access be added to programs at the MPEG-2 transport packet layer rather than at a higher network protocol layer. However, when a program leaves a service provider's file server, it will not be in a convenient format for applying conditional access. Rather, the program, in the form of MPEG-2 transport packets, will leave the file server enveloped in a first network protocol. Additionally, in some applications, the packets may then need to be re-mapped into a second network protocol to conform to the network protocol provided by the network operator. Thus, in this context there is a need for method and apparatus for removing the MPEG-2 transport packets of a particular program from a first network protocol, providing conditional access to the MPEG-2 transport packets, and then mapping the MPEG-2 transport packets back into the first network protocol or into a second network protocol.

SUMMARY OF THE INVENTION

The present invention meets the needs discussed above by providing method and apparatus between the SPs and the Level 1 services provider that accepts programs destined for an STU in the form of MPEG-2 transport packets enveloped in one of a plurality of network protocols. According to the present invention, the packets are removed from a first network protocol. Conditional access layers are applied to the packets. After applying the conditional access layers, the packets are encapsulated and output in a second network protocol destined for the STU.

According to an aspect of the present invention a method of providing conditional access to a selected program is provided. Packets representing a program requested by a customer having an STU are selected. Those program bearing packets are encrypted according to a first encryption algorithm using a first key. The first key used to encrypt the program is, in turn, encrypted according to a second encryption algorithm using a second key. The first keys are transported in packets to the customer's STU along with the program packets. The second key is, in turn, encrypted using a public-key cryptographic technique such that the public key used in the encryption corresponds to the private key of the customer's STU. The encrypted second key is then transported via packets to the STU along with the program and first key packets.

According to another aspect of the present invention, the apparatus provides means for receiving program bearing packets in a first network protocol from a first data link and removing the packets from the first network protocol. The apparatus selects all packets comprising a particular program requested by a customer. Conditional access is then applied to the requested program at the packet layer in accordance with the method described above. The apparatus then encapsulates all packets in a second network protocol and outputs them over a second data link for delivery to the customer's STU.

According to a further aspect of the present invention, a method and apparatus are provided for generating a message authentication code comprised of a hash of the first key and the second key, such that the STU can determine if the packets bearing the first key has been tampered with during transmission. An Additional method and apparatus are provided for applying a digital signature to the encrypted second key, such that the authorized customer can determine the identity of the provider of the encrypted second key, thereby preventing unauthorized users from addressing STUs.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 3 is a functional block diagram illustrating the conditional access scheme provided in accordance with the present invention.

FIG. 9 graphically illustrates the transport overhead structure utilized in the UNISON-1 STS-3c frame structure.

DETAILED DESCRIPTION OF PREFERRED EMBODIMENTS

Figure 1:
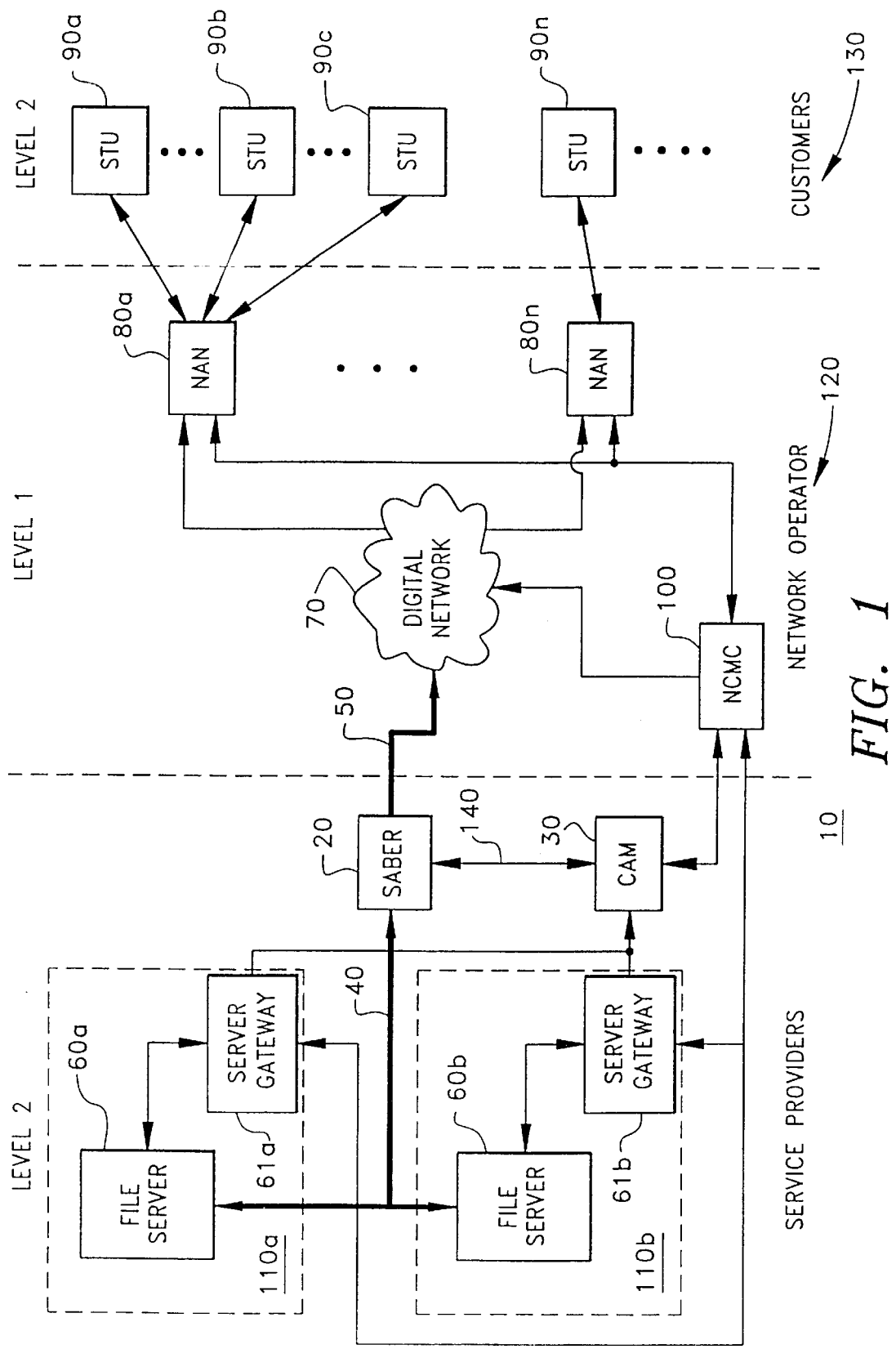
FIG. 1 illustrates an exemplary digital video distribution system in which the present invention may be employed.

Referring to the drawings wherein like numerals indicate like elements throughout, there is shown in FIG. 1 a block diagram of the components of an exemplary digital information distribution system 10 ("distribution system") in which the present invention may be incorporated. A similar system is described in U.S. Pat. No. 5,481,542, which is assigned to the same assignee as the present invention and is hereby incorporated by reference in its entirety. The distribution system 10 provides a mechanism whereby data, such as compressed digital video data from a service provider (SP) 110, is transmitted over a broadband transmission network under the control of a network operator 120 to a customer 130 for presentation to the customer's STU 90. As used herein, the term set top unit refers to any customer device capable of receiving and decoding digital services, such as personal computers, home control terminals, decoders and the like. In the case of a video service, for example, the received information could be displayed on the customer's television or computer screen. A bi-directional communication path is also established and maintained between the SP 110 and the customer 130 by the network operator 120, which allows the customer 130 to interact with the service provider. For example, the customer 130 may wish to select programs from a menu, control the playback of a program, or interact with a video game.

Various aspects of the distribution system 10 incorporating the present invention are described below. First, an overview of the components of the distribution system 10 are described. Following the overview, detailed information concerning the various components of the distribution system 10 that incorporate the present invention is provided.

I. System Overview

When a customer 130 requests a program, the request is routed from the customer's STU 90 through a network access node 80 to the network control and management computer (NCMC) 100. The NCMC 100 then provides a communication connection between a particular service provider 110a, 110b and the customer 130. To establish the connection, the NCMC 100 ensures that bandwidth is available on the digital network 70 and the network access node (NAN) 80. Thereafter, the NCMC 100 passes the customer request to the requested SP 110 via server gateway 61. The server gateway 61 handles communications with various billing agencies to determine the customer's eligibility to receive the requested program and to determine the conditional access requirements for the requested program. An SP stores programs on a file server 60 in the form of Moving Picture Experts Group (MPEG-2) Systems transport packets, containing compressed digital video and audio data as well as other digital service information. The requested MPEG-2 transport packets are then output over data link 40 encapsulated in a network protocol. Ultimately, the packets are to be transmitted through the digital network 70 to a NAN 80 and then to the customer's STU 90. The service providers 110 want to ensure that programs entering the digital network 70 are viewed only by the customers who have been authorized by the server gateway 61. Thus there is a need to provide conditional access to programs before those programs enter the digital network 70. According to one aspect of the present invention, apparatus 20 and 30, referred to herein as Service Access and Broad Band Encrypter Re-mapper (SABER) 20 and Conditional Access Manager 30, are provided between the SP 110 and the digital network 70 to provide a means for adding conditional access to the program to be transmitted. In particular the SABER 20 receives the MPEG-2 transport packets from the SP 110, via data link 140, encapsulated in the network protocol of that link. According to the present invention the SABER 20 extracts the MPEG-2 transport packets, adds conditional access, and then re-encapsulates the packets in a second protocol (which may be the same or different from the first protocol) for introduction into digital network 70. The CAM 30 provides the SABER with information necessary to selectively apply the conditional access to the MPEG-2 transport packets. The CAM 30 receives the conditional access requirements and unique PID assignments for the requested program from the SP via the server gateway 61.

The second network protocol, that of data link 50, may be the same as or different from the first network protocol of data link 40. For example, data link 40 may conform to an FDDI network protocol, while data link 50 may conform to an ATM network protocol, or both data links 40, 50 may conform to an ATM network protocol. Among the protocols presently anticipated by the SABER 20 are SONET-ATM, FDDI, DS-3 and UNISON-1, all of which can be used to transfer Moving Picture Experts Group (MPEG-2) Systems transport packets through data link 40 or data link 50. However, the network protocols listed and described herein are merely illustrative, and should not be construed as limiting the invention to those protocols listed, other protocols, for example, a proprietary protocol, could function equally well.

Significantly, if the digital network 70 were inherently secure (for example, a completely fiber network) the SABER 20 could be located elsewhere in the system 10. In such a secure network, the SABER 20 might be located at the opposite end of the digital network 70, between the digital network 70 and the NANs 80.

Network control and management computer (NCMC) 100 manages sessions between the STUs 90 and the SPs 110. Among its duties, the NCMC 100 is responsible for provisioning the NAN 80, provisioning the STUs 90, providing routing information to the digital network 70 when appropriate, and for providing information session management between the STUs 90 and the SPs 110. In providing the session management, either the STUs 90 or the SPs 110 may send requests for information service connections to the NCMC 100. After receiving a request, the NCMC 100 determines if there are resources available on the network 70 for transporting the requested services and, if so, establishes the requested service connection from the SP 110 to the STU 90. The NCMC 100 then sends the service information to both the STU 90 and the SP 110 to allow them to connect to the network and to begin the requested interactive information service. The NCMC 100 may establish sessions in the manner described in U.S. Pat. No. 5,481,542, which is incorporated herein by reference in its entirety.

II. Service Provider Complex

The SPs 110 control the system that provides programs to the customer. To provide these programs, the SP employs one or more file servers 60, a server gateway 61, and in accordance with the present invention, a conditional access manager (CAM) 30 and a SABER 20. The file servers store programs in MPEG-2 transport packet format for delivery to customers. That is, when a customer requests a program from the file server 60, the file server 60 outputs MPEG-2 transport packets bearing the requested program for delivery over the digital network 70. However, before relinquishing control over a program, an SP 110 would like to diminish the possibility that the program will be diverted to an unauthorized user. In particular the SP 110 would like to add a layer of conditional access to the program to ensure that only the customer that requested the program will have the ability to view it. Currently available file server equipment does not have the capability to add the necessary conditional access layers. If the packets output by the file server 60 are transmitted without conditional access over the digital network 70 and are intercepted by an unauthorized user in possession of a STU 90 capable of decoding MPEG-2 transport packets, that unauthorized user could have access to all transmitted programs.

According to the present invention, conditional access layers are added to the MPEG-2 transport packets by the SABER 20 in conjunction with the CAM 30. The CAM 30 and the SABER 20 coordinate the process of adding conditional access to the transport packets of a given program via an ethernet link 140. Generally, the process of adding conditional access involves encrypting the contents of transport packets and the corresponding keys and ensuring that that information is provided to the STUs 90. Concurrently, the CAM 30 keeps track of program level information (e.g., PID maps and higher levels of encryption keys) which it periodically provides to the SABER 20. Additionally, the CAM 30 periodically generates other data (e.g., system-wide pay-per view access, copy protection information, and the like) that it must deliver to the STU 90. That information is placed in Entitlement Control Messages and Entitlement Management Message that are carried in MPEG-2 transport packets which are multiplexed into the stream of program bearing MPEG-2 packets. A method for providing conditional access information to STUs is described in more detail in Wasilewski, U.S. Pat. No. 5,420,866, which is assigned to the same assignee as the present invention and is hereby incorporated by reference in its entirety. Those packets generated by the CAM 30 are transmitted from the CAM 30 to the STU 90 via the SABER 20, where they are mapped into the network layer protocol of data link 50.

III. The Conditional Access Model of the Present Invention

The inner workings of the SABER 20 and the CAM 30 are better understood with reference to a conditional access model. To that end, a presently preferred embodiment of the conditional access model of the present invention is presented here before embarking on a hardware level description of the implementation details of that model. FIG. 3 presents a functional diagram of the presently preferred conditional access model.

The present invention provides three functional levels of protection: (1) program encryption, (2) control word encryption and authentication, and (3) entitlement message encryption and authentication. At the first level, the program bearing MPEG-2 transport packets are encrypted using random number generated keys, referred to hereinafter as control words. At the second level, the control words are encrypted using a second randomly generated key. This second key is referred to hereinafter as a multi-session key (MSK). At the third level, the multi-session key is encrypted using a public key cryptography technique.

The first level of encryption—program encryption—is indicated in FIG. 3 by box 154. Preferably, the first layer is implemented using a privatekey cryptographic technique. As indicated the program encrypter receives MPEG-2 transport packets as an input, along with a control word, and outputs encrypted MPEG-2 transport packets. The encrypter may employ any suitable encryption algorithm, such as DES or Triple DES. Significantly, in the present embodiment, the header information in MPEG-2 transport packets is never encrypted; conditional access is applied only to the payload portions of the MPEG-2 transport packets. Thus, an STU 90 can read the PIDs and other overhead information carried in the MPEG-2 transport packets without the need to decrypt the packets.

The control words must be transferred to the STU 90 to enable the eventual decryption of the program. During this transfer, the control words are vulnerable to unauthorized access. Thus, at the second level of the encryption model, the control words are encrypted using the MSK to prevent an unauthorized user from gaining access to them and, thereby, to the programs they were used to encrypt. This is indicated in box 153, which shows the control words as an input, along with the MSK, and encrypted control words as an output.

The MSKs must also be securely transferred to the STU 90. The third level of the encryption model supports this secure transfer. In accordance with another aspect of the present invention, this third level of encryption uses a public-key encryption algorithm to encrypt the MSKs, which obviates the need to securely transfer an endless hierarchy of keys from the SP 110 to the STU 90. According to this technique, each STU 90 has a private key and a corresponding public key. As indicated by box 300, the public key for a particular STU 90 is used to encrypt the MSK. Moreover, as will be described in detail below, a digital signature technique is used to further guarantee the security of the conditional access system. As a result, the MSK can be securely transferred to the STU 90. No further encryption levels are necessary, because the STU 90 already contains the private key that corresponds to its public key, which the STU 90 can use to decrypt the MSK.

Of all the keys used in the present invention, the control words, used in the first level of encryption, change most often, e.g., every few seconds. This frequent key changing is designed to thwart attempts by unauthorized users to compromise the encryption algorithm by discovering the key. Such a design is effective because even if an unauthorized user came into possession of a control word, that control word would expire before any advantage could be gained. However, because the control words change often and the encryption must be performed quickly to keep up with the high program data rates, a private key encryption scheme with a relatively small control word is used (e.g., DES with a 56-bit key).

The conditional access solution of the present invention overcomes an additional obstacle—only a single interactive connection exists between the SP 110 and the STU 90, and that connection is assumed not to be secure. As a result of having a single interactive connection, the SP 110 must send the encryption keys along with the program to the STU 90 over that same connection. Any assumptions about the insecurity of the network also apply to the transmission of keys from the SP 110 to the STU 90. In order to provide adequate security to the transmission of programs and overcome the single connection obstacle, the control words must also be protected from unauthorized access. Thus, at the second level of the conditional access model, the control words are themselves encrypted using a second encryption algorithm. Significantly, the data rates required to transmit encrypted control words to the STU 90 are much lower than the data rates required to transmit the program data. Consequently, the keys can be encrypted with a longer key and a more robust encryption algorithm (e.g., Triple DES with a 112 bit key).

As noted, the system must deliver the control words to the STU 90 over the single interactive connection. Accordingly, the control words are inserted into MPEG-2 transport packets for transmission to the STU 90. The control words are delivered to the STU 90 in the form of entitlement control messages (ECM). Such messages are used to transmit control words to the STUs 90 along with authentication information, such as a message authentication code. Each ECM comprises header information, and the ECM payload, which contains the control word and a message authentication code.

Message authentication is another mechanism provided at the second conditional access level, ensuring that the ECM data is not tampered with during transmission. In the present embodiment, this authentication is accomplished by use of a message authentication code (MAC), which is transmitted with the encrypted control words in the ECM. The mechanism is illustrated in FIG. 3A.

Figure 3A:
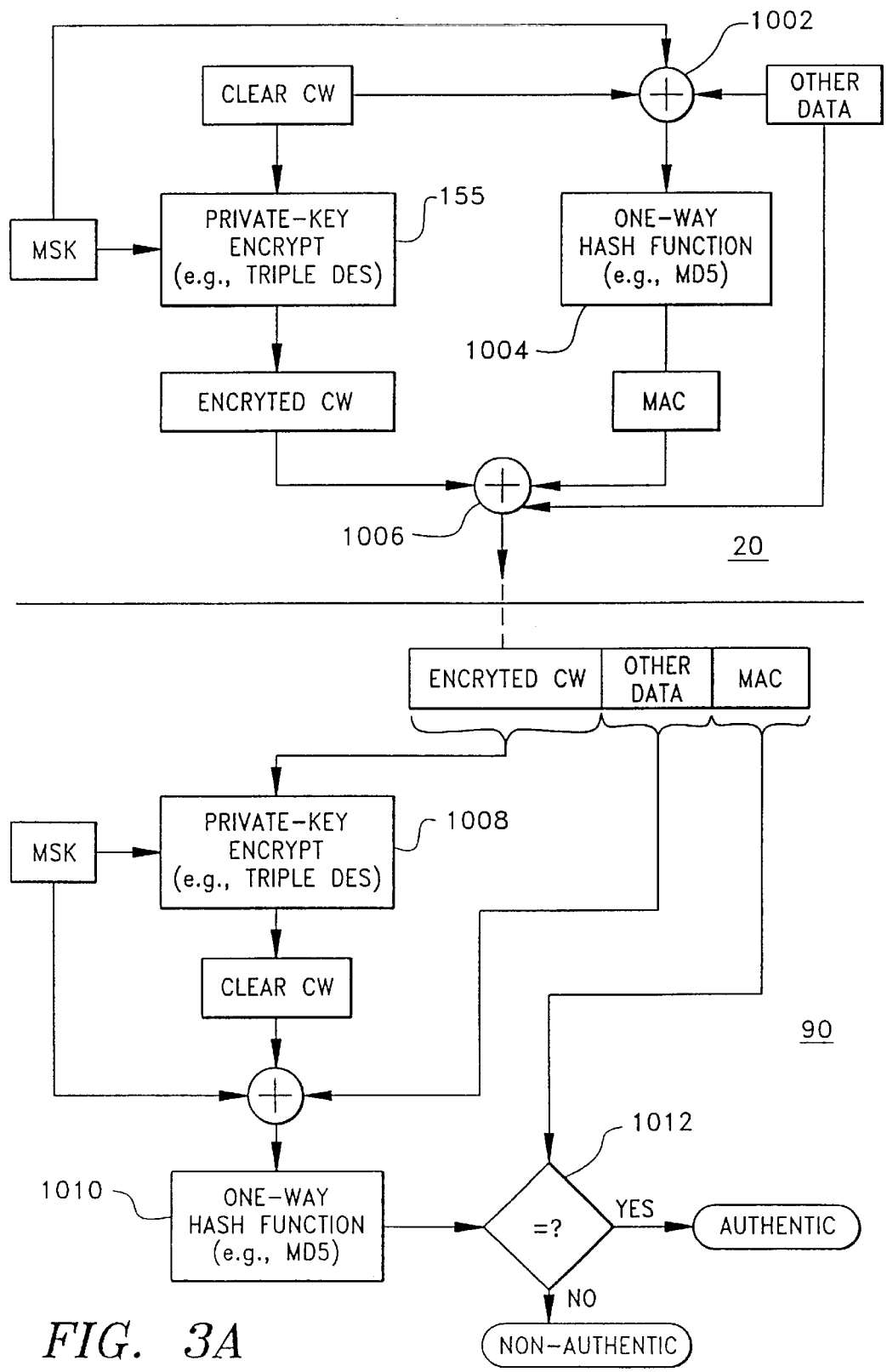
FIG. 3A is a functional block diagram illustrating the process of message authentication of control words in accordance with the present invention.

As shown in FIG. 3A, in the SABER 20, the clear (alternately referred to as non-encrypted) control word is encrypted with the MSK as signified by box 155. At the same time, the clear control word, other data (e.g., system-wide pay-per view access, copy protection, and the like), and the MSK are concatenated together (1002). This concatenation is then hashed, as indicated at box 1004, using a one-way hash algorithm, such as the well-known Message-Digest (MD5) algorithm, to produce a MAC. The MD5 hash produces an output value from which it is computationally infeasible to discover the input value to the hash algorithm. The MAC is appended to the encrypted control word, as indicated at 1006. The producer of the MAC (e.g., the SABER 20) must know both the pre-encrypted control word and the MSK to produce a proper output hash value. The resulting hash value is transmitted to the STU 90, along with the encrypted control word, in the ECM.

At the STU 90, the MAC process is reversed before releasing the control word for use in decryption. The encrypted control word is parsed from the ECM and decrypted with the MSK (box 1008), which was transmitted to the STU 90 (as indicated by dashed lines in FIG. 3A) through a mechanism described in detail below. The now clear control word and the MSK are concatenated and hashed (box 1010) in similar fashion to the technique used in the SABER 20 prior to transmission. This hash value is then compared to the MAC received in the ECM (1012). If the two values match then the control words are authorized for use by the STU 90 in decrypting the program.

The ECMs (i.e., encrypted control words and corresponding MACS) may be carried in MPEG-2 transport packets in one of two ways: (1) as part of the adaptation fields within the MPEG-2 transport packets that carry the program data that the control words were used to encrypt, or (2) as separate MPEG-2 transport packets. In the second case, a unique PID is assigned to those packets, and they are multiplexed into the stream of packets bound for the STU 90.

In the third encryption level, because the rate necessary to transmit the MSKs to the STU 90 is lower than the control word transmission rate (the MSK only changes on the order of once a day to once a month), the MSK can be subjected to enhanced protection. Moreover, the consequences of a discovered MSK may be greater than the consequences of a discovered control word. This is so because the MSK remains valid for a much longer duration and may apply to multiple programs. Thus, a more robust encryption algorithm is prudent. According to the present invention, a public-key encryption algorithm is utilized for this third level encryption.

According to the present invention, each STU 90 has a public key/private key pair. The private portion of the key pair is stored securely within the STU 90 and is never disclosed publicly. A variety of means can be employed to ensure that the private key is not publicly disclosed. For example, the private key can be implanted during manufacture into a tamper resistant processor in the STU 90. All records of the private key for that STU 90 can then be destroyed to guarantee that no unauthorized users will discover the private key. Alternatively, the STU 90 can contain an algorithm that generates a public key/private key pair. In this scheme, when the STU 90 is started for the very first time, it generates a key pair, secure the private key portion internally, and provides the public portion as an output. As a consequence, the only record of the private key will remain securely stored within the STU 90, without any record of the private key ever being known external to the STU 90.

The public key corresponding to a particular private key is used to encrypt messages (e.g., MSKs) in the CAM 30 prior to transmission to the STUs 90. The public key can be made widely available, without compromising the integrity of the conditional access system. In a Level 1/Level 2 architecture in which multiple SPs 110 may have access to the multiple STUs 90, the wide availability of public keys allows the multiple SPs to share a single STU 90 without concern that the third level key will become known to unauthorized users. But, because the list of public keys are widely available to multiple SPs 110, a method of sharing key information among the SPs 110 is required.

According to the presently preferred embodiment of the present invention, a conditional access authority will maintain the integrity of the public keys and distribute the public keys to the SPs 110 as needed. The conditional access authority maintains a public key database with which it is trusted to ensure that every public key corresponds to the proper STU 90. Otherwise, if the integrity of the conditional access authority is compromised, an unauthorized user could falsify a key entry in the tables maintained by the conditional access authority, which would in turn provide a false public key to the SPs 110. Thus, messages intended to be transmitted by an SP 110 to an authorized STU 90 could be diverted by the unauthorized user. The conditional access authority may also maintain a public key reference for all the SPs 110. So that STUs 90 may be provisioned with SP 110 public keys in verifying SP 110 digital signatures.

As a final part of the conditional access system, a strategy for prohibiting unauthorized users from sending entitlement management messages (i.e., messages that carry the MSKs to a particular STU 90) to the STUs 90 is provided. The public key for a particular STU 90 may be widely available and susceptible to discovery by unauthorized users. Without some additional protective mechanism, an unauthorized user could obtain the public key for one of the STUs 90 and deliver a message to it; the STU 90 would accept the message and decrypt it. False MSKs could thus be sent over the digital network 70, compromising the integrity of the system. In order to prevent such an occurrence, a digital signature is used, which authenticates the sender of the message as an authorized SP 110. Specifically, before transmission, a digital signature is used to "sign" a hashed message with the SP's 110 private key. After reception of that message, the STU 90 uses the SP's 110 public key to verify that the message is authentic.

Figure 3B:
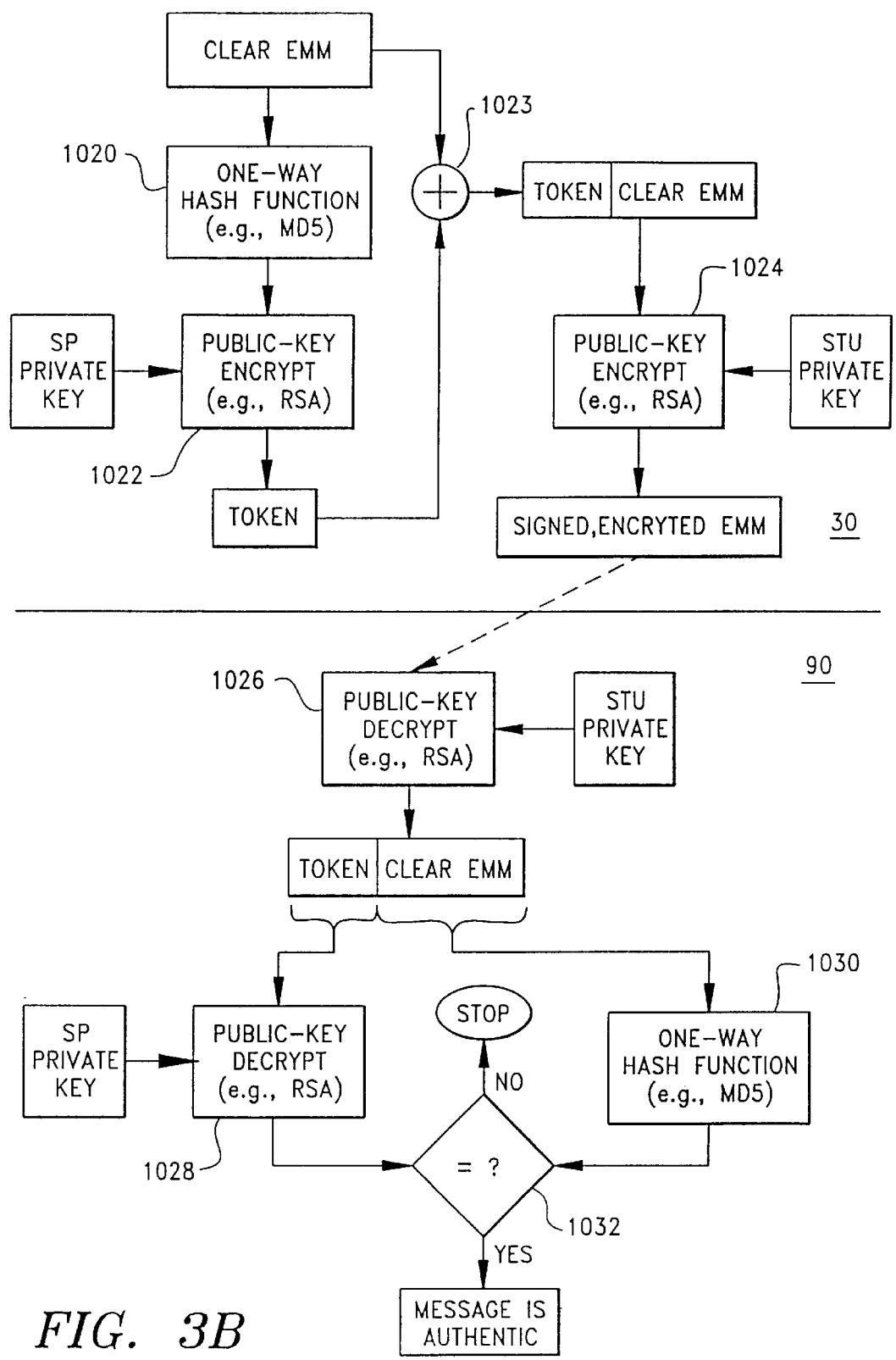
FIG. 3B is a functional block diagram illustrating the process of adding a digital signature to an MSK in accordance with the present invention.

This digital signature mechanism is illustrated in FIGS. 3B. At the transmission end of the system (i.e., at the CAM 30), a clear EMM (which may contain an MSK or other STU 90 specific information) to be sent to an STU 90 is hashed (box 1020) using a one-way hash function, such as the well-known MD5 hash algorithm. The output hash value is then encrypted using the private key of the SP 110 that sending the EMM. Encryption is performed using a well-known public-key encryption algorithm, such as RSA. This process creates a digital signature token that is appended to the clear EMM as indicated at 1023. The digitally signed EMM is then encrypted with the public key of the STU 90 that is to receive the message. This signed, encrypted EMM is then transmitted to the STU 90 via digital network 70.

The EMM is addressable to a group of or individual decoders, and contains the MSK and the digital signature as well as other information, such as address and message length. Each STU 90 contains a unique public address that identifies the decoder. Before the EMM is transmitted, this public address information is embedded in a clear field of the EMM. The STU 90 examines the clear public address field of all incoming EMMs and accepts those that contain its particular public address. In this manner, specific information may be transmitted to individual STUs 90.

When the EMM is received by the STU 90, the STU 90 decrypts the EMM with its private key (box 1026). This results in a clear EMM carrying the MSK and a token, which bears the digitally signed hash of the EMM. The token portion of the message (i.e., the digitally signed hash) is decrypted with the SP's public key (box 1028), which results in a hashed EMM. Concurrently, the clear EMM output from box 1026 is hashed to produce a hashed EMM. If the message is authentic, then the two hash values will be equivalent (box 1032). The MSK that arrived in the EMM can then be authenticated for use by the STU 90. In order to determine the proper SP 110 public key at box 1028 and thereby decrypt the messages received, the STU 90 will keep an internal list of public keys corresponding to the private keys of authorized SPs 110. This information is provided to the STU 90 by the conditional access authority to ensure the integrity of the public keys.

In summary, a stream of program bearing MPEG-2 transport packets enter the SABER 20 embedded in a network protocol layer. The SABER 20 removes the first network protocol layer to access the MPEG-2 transport packets. Conditional access layers are added through multiple encryption levels. MPEG-2 transport packets bearing ECMs and EMMs generated by the conditional access process are multiplexed with the transport packets that carry the data (e.g., video, audio) of the user selected program to form a single outgoing packet stream destined for the STU 90. Before the MPEG-2 transport packets exit the SABER 20, they are encapsulated into the original network protocol in which they were received or a different, second network protocol layer for transmission over the digital network 70.

The details of the inner-workings of the SABER 20 are discussed below in approximately the order of packet flow through the conditional access system. A departure from that order is made in describing the input 28 and output cards 26. Those cards are described together because of their functional overlap. Following the input and output card descriptions, details of the various components that implement conditional access are described.

IV. The Service Access and Broadband Encrypter Re-mapper (SABER).

The SABER 20 receives input from various other system components. From the file server(s) 60, over data link 40, the SABER 20 receives programs in the form of MPEG-2 transport packets embedded in a network protocol layer. From the CAM 30 over an ethernet interface 140, the SABER 20 receives program specific encryption information (i.e., which programs, identified by PIDs, should be encrypted) and replacement PID values. When the SABER 20 has finished adding conditional access layers to a program, it re-encapsulates the MPEG-2 transport packets of the program into a second network protocol and transmits them to the digital network 70 over data link 50.

Figure 2:
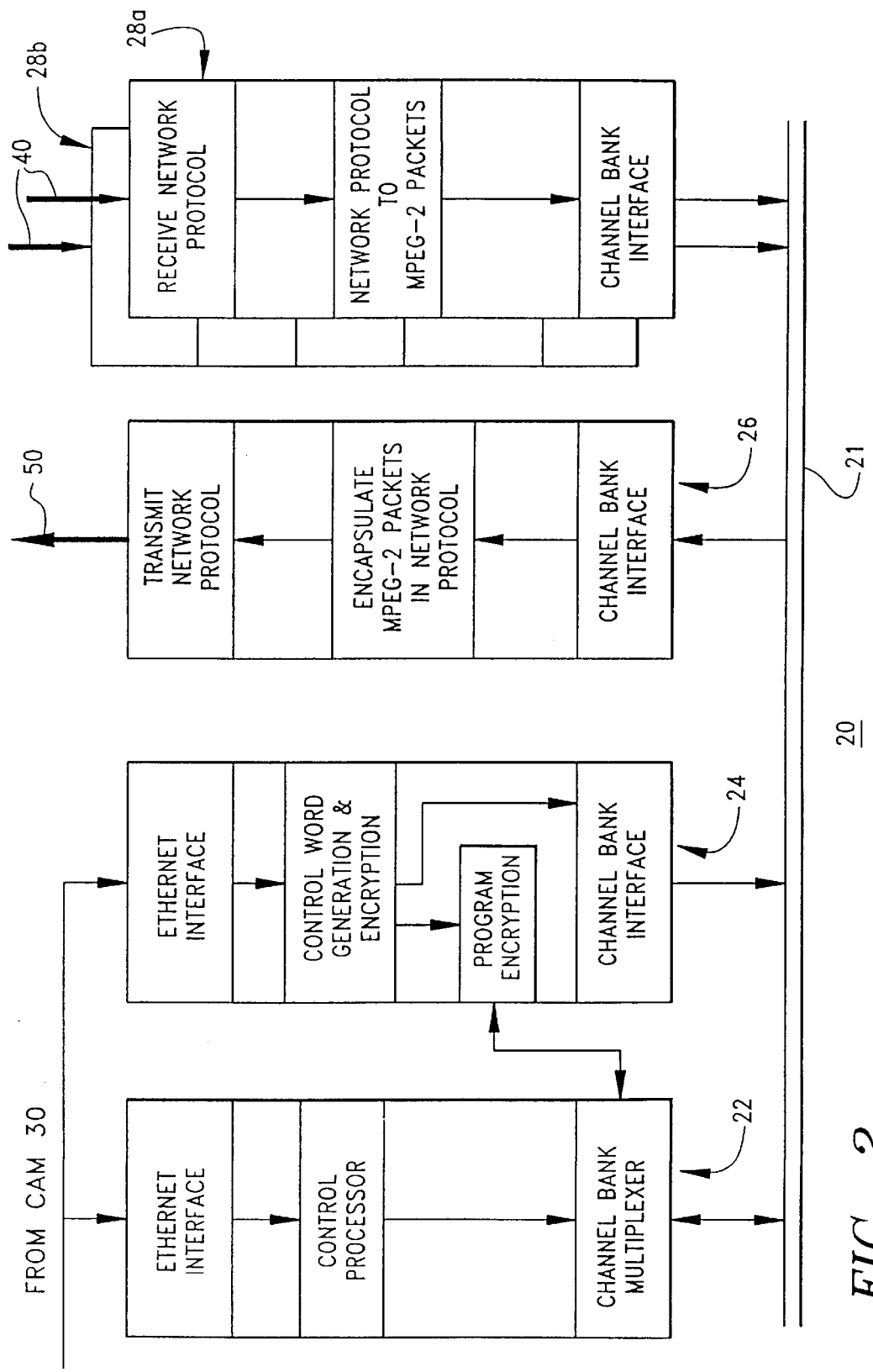
FIG. 2 is a block diagram providing further details of a server access and broadband encrypter re-mapper in accordance with a presently preferred embodiment of the invention.

As illustrated in FIG. 2, internally the SABER 20 is comprised of a channel bank backplane 21 for inter-card communication, one or two input cards 28, an output card 26, a conditional access card 24 and a control card 22. Non-encrypted programs are received from a SP 110 via the input cards 28a and 28b, which remove the MPEG-2 transport packets of the programs from the network protocol of data link 40 and replace the PIDs assigned by the file server of the SP 110 with new PIDs. These PIDs are replaced by the SABER 20, as provided by the CAM 30, to prevent multiple programs from multiple SPs 110 from delivering program information in MPEG-2 transport packets with identical PIDs. The MPEG-2 transport packets are then sent over the backplane 21 to the control card 22, which multiplexes multiple MPEG-2 transport streams together when more than one input card 28 is used. The control card 22 then transfers the transport packets to the conditional access card 24 over data path 150. The conditional access card 24 encrypts the transport packets as required and sends them back to the control card 22 via data path 150. The transport packets are then multiplexed and sent over the backplane 21 to the output card 26, where they are embedded into a second network protocol for transmission over data link 50.

A. Channel Bank Backplane

The Channel Bank Backplane 21 is an inter-card communication interface. The bus ensures that the cards of the SABER 20 can transmit control information and transport packets among themselves. All the cards desired for a particular set-up are configured and then plugged into the backplane 21. For example, if a SABER 20 is desired that accepts MPEG-2 transport packets in an FDDI network protocol and outputs MPEG-2 transport packets in an SONET-ATM network protocol, then FDDI capable input cards 28 and a SONET-ATM capable output card 26 are plugged into the backplane 21 in the appropriate slots and the desired protocol conversion is accommodated.

The backplane 21 is an 8 bit-parallel data bus with clock, enable and sync lines. The bus operates at a clock rate of 27 MHz, which is the nominal clock rate defined by the MPEG-2 standard. Each card, with the exception of control card 22, interfaces to the backplane 21 through a common channel bank interface (CBI). The CBI provides a FIFO buffer and glue logic for inter-card communication. The CBI operates in conjunction with the channel bank multiplexer (CBMUX) 152 on the control card 22, to transfer MPEG-2 transport packets across the backplane 21. Cards that need to transfer data over the backplane 21, such as the input cards 28, have a local buffer within the CBI to store MPEG-2 transport packets until packets transfers are requested by the CBMUX 152. When polled by the CBMUX 152, the CBI transfers a packet over the backplane 21 where it is retrieved by the CBMUX 152 on the control card 22. Control information is transferred between cards over the backplane 21. Although the presently preferred bus is a high speed 8-bit parallel bus, those skilled in the art should appreciate that alternate bus designs could function equally well, for example, a 32-bit parallel bus could be used.

The CBMUX 152 also directs the CBI on a particular card to accept packets from the backplane 21. For example, in order for the CBMUX 152 to transfer a packet to the output card 26, the CBMUX 152 signals the CBI on the output card 26 to receive the packet. The packet is then output over the backplane 21 where it is received and buffered by the CBI on the output card 26.

B. Input/Output Cards

According to another aspect of the present invention, the SABER 20 has a capability to conform to different protocols merely by selectively plugging cards into the backplane 21 that implement the desired protocol. Such capability facilitates the ability of SABER 20 to translate between a variety of network protocols. To facilitate this multiple translation feature, the appropriate input card 28 and output card 26 are selected, configured, and plugged into the proper slots in the SABER 20. The input card 28 that matches the input network protocol of data link 40 is plugged into the backplane 21. The output card 26 that matches the output network protocol of data link 50 is also plugged into the backplane 21. As a result, the SABER 20 can translate between the two network protocols selected from the group of network protocols supported by the input card 28 and output card 26, while providing conditional access.

The cards 26, 28 that interface to the network data links 40, 50 are generally implemented as a single card that operates in either an input mode or an output mode. For example, if SONET-ATM is selected as the input network level protocol for data link 40, a SONET-ATM I/O card would be configured as an input card 28. The card 28 will then accept data in the form of SONET frames carrying ATM cells that contain MPEG-2 transport packets. The card 28 will extract the MPEG-2 transport packets from each incoming data stream. On the other hand, if SONET-ATM is selected as the output network protocol for data link 50, an identical card could be configured to map MPEG-2 transport packets to, and output packets in, ATM-cell bearing SONET frames.

Functional descriptions of the input card 28 and output card 26 are described below. Following the functional descriptions, the various mappings from network layer protocols to MPEG-2 transport packets are described. Finally, details are provided that describe two exemplary input/output card implementations.

1. Input Card Functions

An input card 28 may conform to one of a variety of network protocols. For example, the input card 28 may receive programs in an FDDI, SONET-ATM, UNISON-1, or DS-3 protocol. However, these protocols are merely examples and should not be construed as limiting. An input card 28 accepts program data from data link 40 in the form of MPEG-2 transport packets which are embedded in the network protocol layer of data link 40 and then extracts the MPEG-2 transport packets from the network protocol layer. Examples of the mapping between MPEG-2 and the various protocols are described more fully below.

In addition to removing the network protocol from the received data, the input cards 28 re-map the PIDs carried in the set of MPEG-2 transport packets of each program. As noted above, programs are stored on the file servers 60 in MPEG-2 transport packets. When a program is output from a file server 60, the file server 60 assigns Packet Ids (PIDS) to the transport packets of the program that are unique with respect to that file server 60. However, multiple file servers 60 feed programs to the SABER 20, and potentially, multiple SABERs 20 feed programs to the digital network 70. If two or more file servers 60 output programs in MPEG-2 transport packets bearing identical PIDs, collisions will occur. Accordingly, the CAM 30 (see FIG. 1), in conjunction with information provided by the NCMC 100, keeps track of the PIDs in use over the network and provides the SABER 20 with a PID re-mapping table that gets stored on the input card 28. After the input card 28 has removed the network protocol layer, the PIDs assigned by the file servers 60 are extracted from the MPEG-2 transport packets. The input card 28 then searches the PID re-mapping table for available PIDs and replaces the PIDs received from the file server 60 with those specified in the table, before transferring those packets to the control card 22. In this manner, the NCMC 100 and CAM 30 ensure that no PID collisions occur downstream in the system 10.

2. Output Card Functions

As with the input cards 28, the output card 26 conforms to one of a variety of network protocols. Moreover, with the exception of PID re-mapping, the output card 26 performs the functional opposite of the input card 28. Essentially, the output card 26 receives MPEG-2 transport packets from the backplane 21 through its CBI and maps the MPEG-2 transport packets into the network protocol of data link 50. Then, the output card 26 outputs the particular program over the data link 50. The example mappings presented below describe, in detail, how the MPEG-2 transport packets are mapped to or from a given network protocol. In the input mode, the MPEG-2 transport packets are removed (i.e., mapped out) from the network protocol. In the output mode, the MPEG-2 transport packets are mapped into the network protocol.

3. MPEG-2 ←→ Network Layer Protocol Mappings

Figure 4:
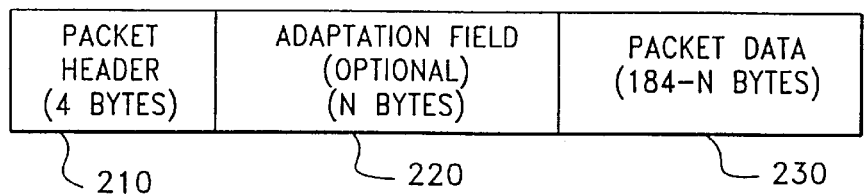
FIG. 4 graphically illustrates the structure and content of an exemplary MPEG-2 transport packet.

Understanding the format of an MPEG-2 transport packet is a prerequisite to understanding how these packets are mapped among the various network protocols. Accordingly, FIG. 4 illustrates a standard MPEG-2 transport packet 200. As depicted, the MPEG-2 transport packet is a fixed length packet of 188 bytes. Further, those 188 bytes are divided among a 4 byte header 210, a variable length adaptation field 220 of n bytes, and a 184-n byte payload 230. The adaptation field 220 is optional and may contain such things as timestamps for synchronizing the components of distribution system 10. As a general rule and as is described more specifically according to each network protocol below, to efficiently map the MPEG-2 transport packets of a given program to the desired network layer protocol, the MPEG-2 packets are sometimes concatenated to form larger data blocks and sometimes segmented to form shorter data blocks. Exemplary protocol mappings are provided below.

a. MPEG-2 ←→ SONET-ATM mapping

According to a presently preferred embodiment, an available selection of input/output cards 26, 28 support a mapping between MPEG-2 transport packets and SONET-ATM. This mapping consists of several layers of translation. First, MPEG-2 transport packets are mapped into ATM cells via AAL5 PDUs, then the ATM cells are mapped into SONET frames. This mapping is illustrated in FIG. 5.

Figure 5:
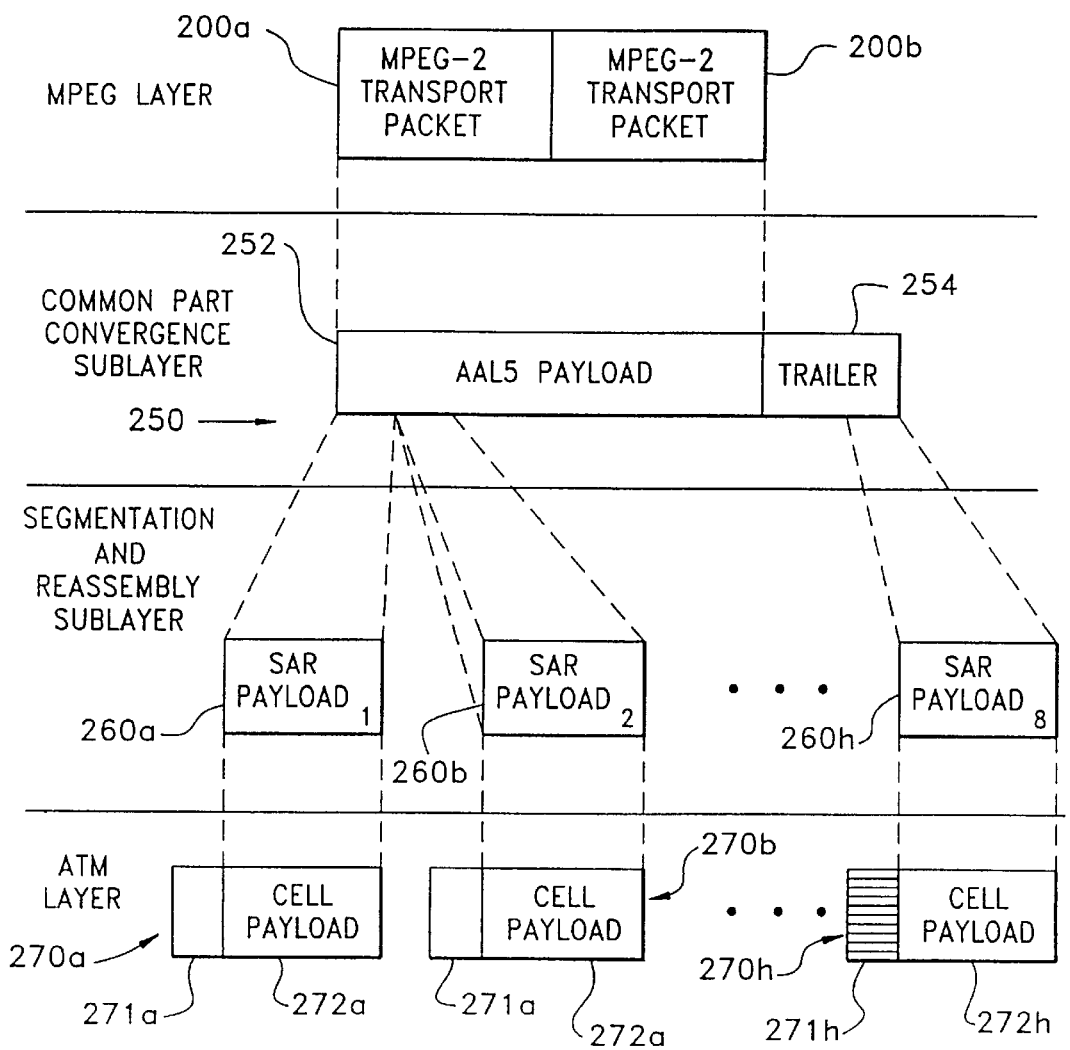
FIG. 5 graphically illustrates the mapping of MPEG-2 transport packets into ATM cells in accordance with the present invention.

As shown in FIG. 5, the mapping between MPEG-2 and ATM is facilitated by the use of ATM adaptation layer 5 protocol data units (AAL5 PDU). The AAL 5 PDU has a variable length payload field that generally must be padded to align to a 48-byte boundary. The 8-byte trailer contains standard AAL 5 PDU information, such as length and CRC-32 information. Two MPEG-2 transport packets 200*a* and 200*b* map into the payload 252 of a single AAL5 PDU 250 at the common part convergence sublayer. Because the two 188-byte MPEG-2 packets and the 8-byte trailer are aligned to a 48-byte boundary (i.e., equally divisible into 48-byte blocks), no padding is required. Thereafter, the mapping proceeds according to standard ATM specifications. Conveniently, the payload 252 and the trailer 254 of the AAL5 PDU 250 together total 384 bytes, which segments into exactly eight segmentation and reassembly PDUs 260. These eight 48-byte SAR PDUs 260 fit into the payload 272 of eight ATM cells 270. The ATM cell header 271*h* of the eighth cell 270*h* has its user-to-user indicator bit set to 1, which indicates that it is the last cell of the group of eight that comprise the two MPEG-2 transport packets 200*a* and 200*b*.

When mapping from ATM cells into MPEG-2 packets, ATM cells are grouped by the number of cells between cells with user-to-user interface bits set to one. The payload of each of the eight cells is removed and concatenated. The CRC-32 value can then be checked at the common part convergence sublayer to verify the data. If the data is valid the AAL 5 payload can be divided into the two MPEG-2 transport packets. SONET OC-3 provides the physical layer for transmitting the MPEG-2 bearing ATM cells. Accordingly, the ATM cells must be further mapped into SONET frames for transmission over the physical data links 40, 50. The SONET to ATM mapping follows the well-known UNI 3.1 standard, which is described in detail in the ATM User-Network Interface Specification, Version 3.1, which is hereby incorporated by reference. SONET OC-3 provides a physical connection at 155.52 Mbps. Generally, the mapping of ATM cells is performed in a row alignment fashion, with the byte structure of the ATM cell aligned with the byte structure of the SONET payload. The ATM cells fill the entire SONET frame payload. Although the SONET connection performs at 155.52 Mbps, because of the SONET overhead, the actual transfer capacity for ATM cells is 149.76 Mbps.

b. MPEG-2 to FDDI Mapping

Figure 6:
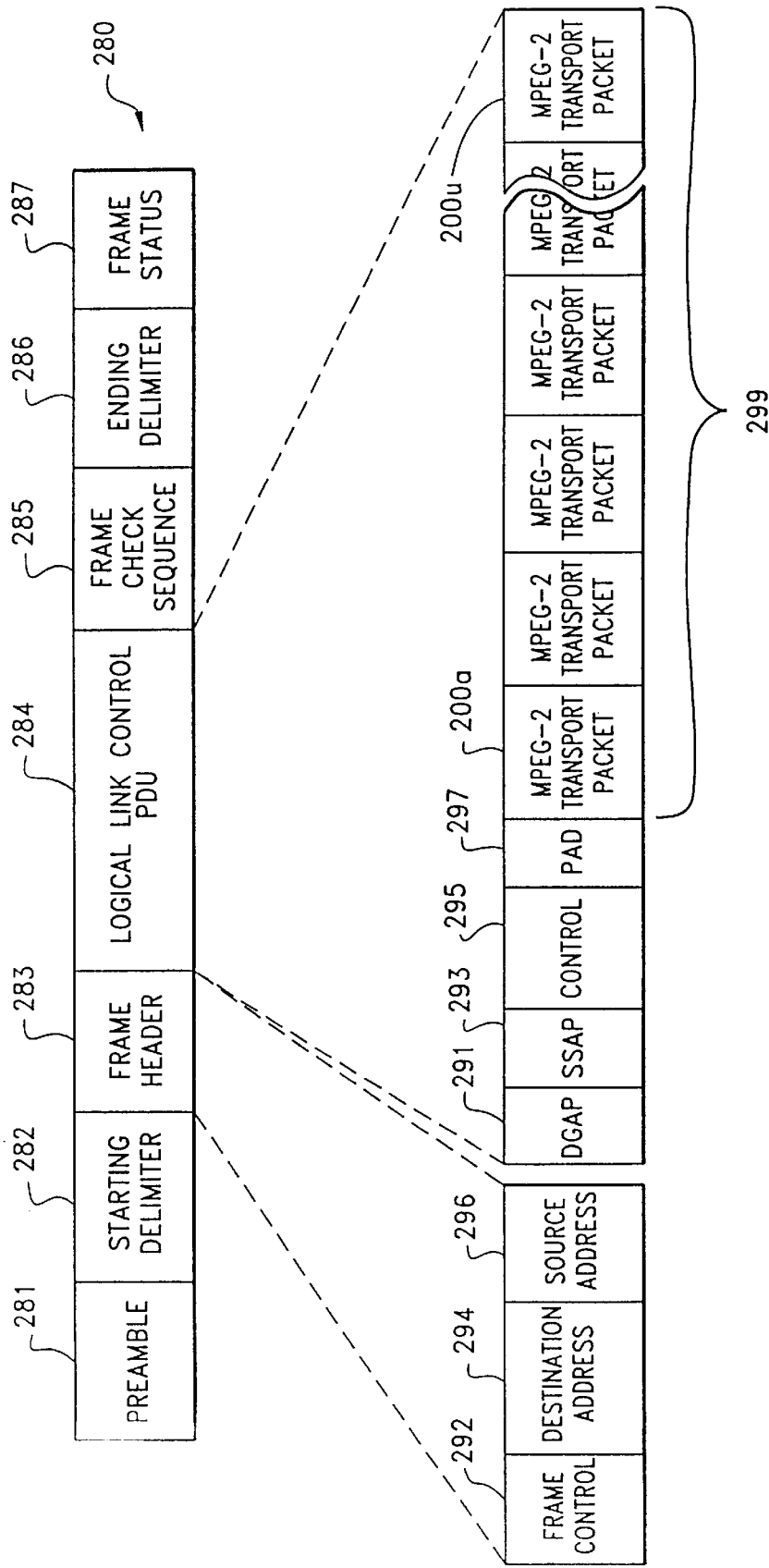
FIG. 6 graphically illustrates the mapping of MPEG-2 transport packets into an FDDI frame in accordance with the present invention.

A standard FDDI frame is illustrated in FIG. 6. Standard FDDI frames 280 are a maximum of 4,500 octets, comprised of a preamble 281, starting delimiter 282, frame header 283, information (herein conforming to Logical Link Control PDU format) 284, frame check sequence 285, ending delimiter 286 and frame status fields 287. All of these fields are standard FDDI protocol and are not modified with respect to the mapping of MPEG-2 transport packets. For example, the frame header field 283 contains standard destination address field 294 and source address field 296. The frame control field 292 within the frame header 283 contains an indicator that the frames are asynchronous non-source routed Logical Link Control frames. Thus, the information field 284 within the FDDI frame 280 contains data in Logical Link Control PDUs that conform to standard IEEE 802.2 Type I packets. The payload 299 contains the MPEG-2 transport packets 200*a*–200*u* concatenated end to end, with a single payload carrying a maximum of 21 MPEG-2 transport packets for a total of 3948 octets.

c. MPEG-2 to DS-3 Mapping

Figure 7:
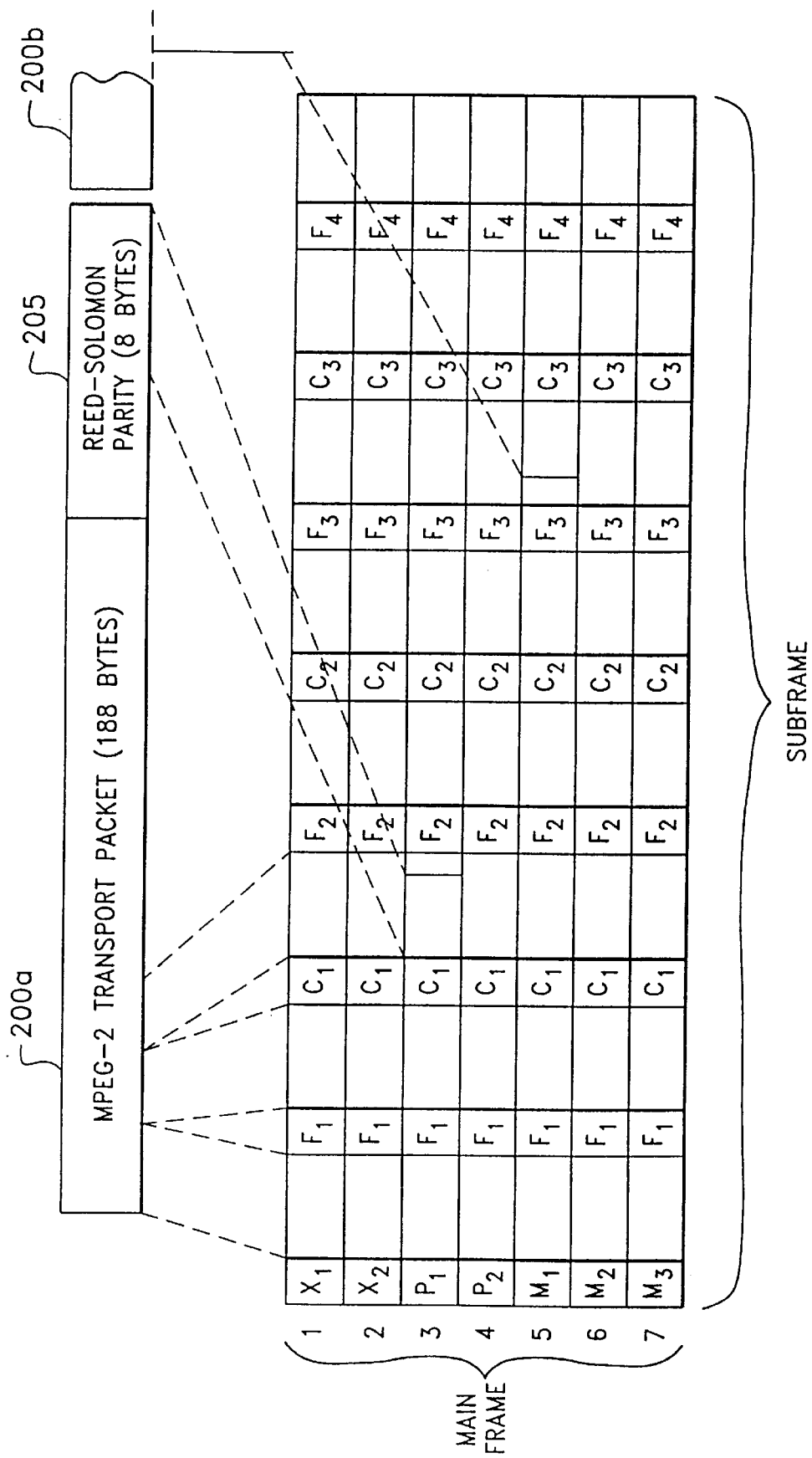
FIG. 7 graphically illustrates the mapping of MPEG-2 transport packets into a DS-3 frame in accordance with the present invention.

FIG. 7 illustrates the MPEG-2 transport packet to DS-3 frame mapping. According to the mapping, three MPEG-2 transport packets 200*a*, 200*b*, and 200*c* (not shown) map into a single DS-3 frame. For DS-3 mapping, each 188 byte MPEG-2 transport packet is concatenated with an additional 8 byte trailer 205 giving a final packet length of 196 bytes. The trailer contains t=4 Reed-Solomon forward error correction bytes. A single DS-3 frame may contain up to 4,704 bits or 588 bytes of data. Since the MPEG-2 transport packets with the Reed-Solomon encoding are 196 bytes, three MPEG-2 transport packets map into the data bits of a DS-3 frame. The three concatenated MPEG-2 transport packets are then loaded into the DS-3 frame data bits with the most significant bit of the first transport packet aligned with the most significant bit of the DS-3 frame. No subframe alignment is necessary.

d. UNISON

The data links 40 or 50 may also transport digital data in accordance with a UNI-directional, Synchronous Optical Network (UNISON-1) interface developed by the assignee of the present invention. The UNISON-1 interface has physical layer characteristics as well as an underlying network transport structure modeled after the Synchronous Optical Network (SONET) transport protocol. A UNISON-1 network provides point to point optical communications using a modification of SONET which does not require complete conformance to the SONET specifications. The physical interface for the UNISON-1 optical signal preferably meets the specifications described for the OC-3 optical interface, intermediate reach, as defined in Bellcore document TR-NWT-000253, Issue 2, December 1991, Section 4, Table 4.11, Column IR-1, while the physical/optical connector is preferably an FC/PC mechanical connector. The UNISON-1 interface signal is preferably synchronized from a Stratum 3 timing source derived from a Regional Bell Operating Company.

Preferably, the basic data rate utilized in the digital network 70 in accordance with the invention is the Synchronous Transport Signal Level 3 concatenation (STS-3c) rate of 155.52 Mbps. Concatenation refers to the transport condition of a SONET system where the entire Synchronous Payload Envelope (SPE) is treated as a single entity or contiguous data stream. In a preferred embodiment, MPEG-2 transport packets are mapped into the SPE and are then passed to the digital network 70 as a single entity. The optical counterpart of the STS-3c is the Optical Carrier Level 3 signal (OC-3), which is the result of a direct optical conversion of the STS-3c after frame synchronous scrambling.

Figure 8:
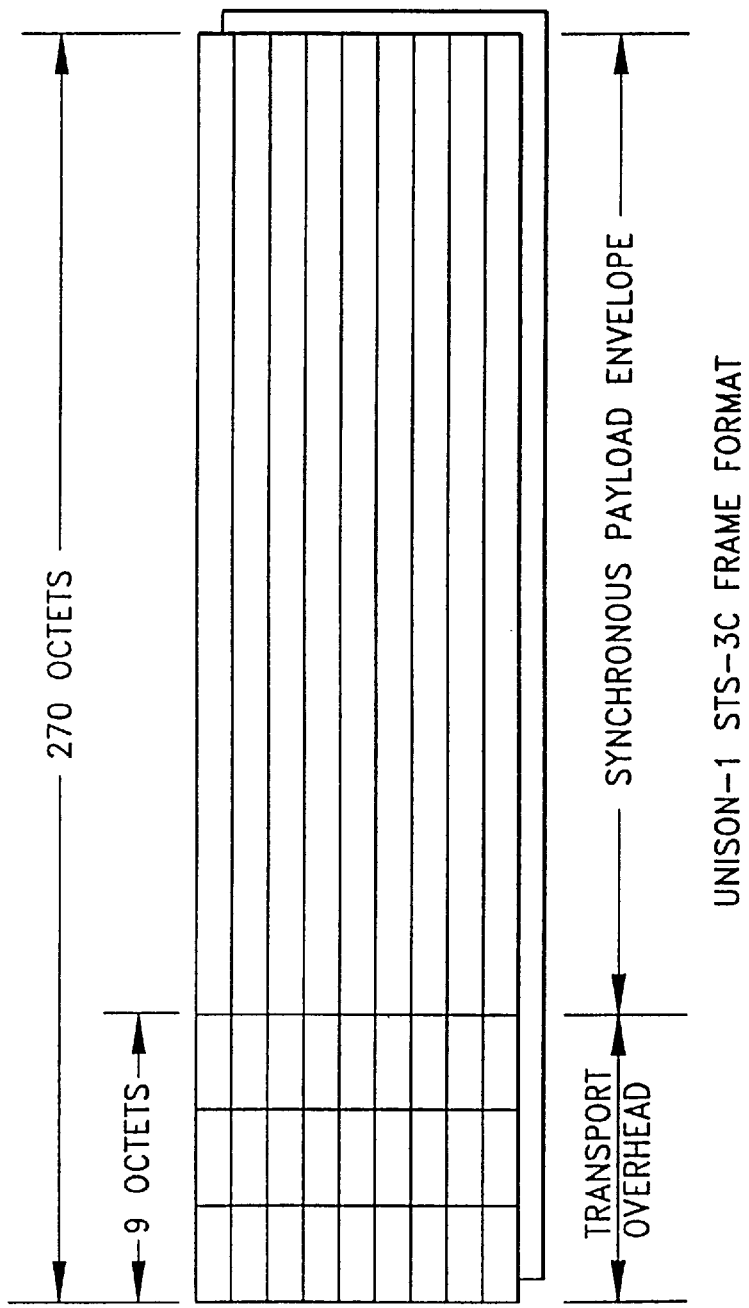
FIG. 8 graphically illustrated the mapping of MPEG-2 transport packets into a UNISON frame in accordance with the present invention.

As shown in FIG. 8, a preferred embodiment of the STS-3c frame for UNISON-1 in accordance with the invention consists of 270 columns and 9 rows of 8-bit octets, for a total of 2430 octets. With a frame length of 125 microseconds (8000 frames per second), the STS-3c has a it rate of 155.52 Mbps. In a preferred embodiment, the first three columns in each row are the Transport Overhead ontaining overhead octets of Section and Line layers. As hown in FIG. 9, 81 octets are thus allocated, with 27 octets allocated for Section Overhead and 54 octets allocated for Line Overhead. The Section Overhead for STS-3c preferably consists of the following fields: STS-3c framing (A1 and A2), multiplex identification (C1), bit-interleaved parity (BIP-8) (B1) for Section error monitoring functions, and three octets allocated to form one 192 kbps message based channel (D1, D2 and D3). E1 and F1 are currently unused. The Line Overhead for the STS-3c, on the other hand, preferably consists of a pointer field (H1 and H2) which provides offset in the octets between the pointer and the first octet of the STS SPE and indicates when concatenation has occurred, a bit-interleaved parity field (B2) for line error monitoring functions, and nine octets allocated to form one 576 kbps message channel (D4 through D12). H3, K1, K2, Z1, Z2, and E2 are currently unused.

Figure 10:
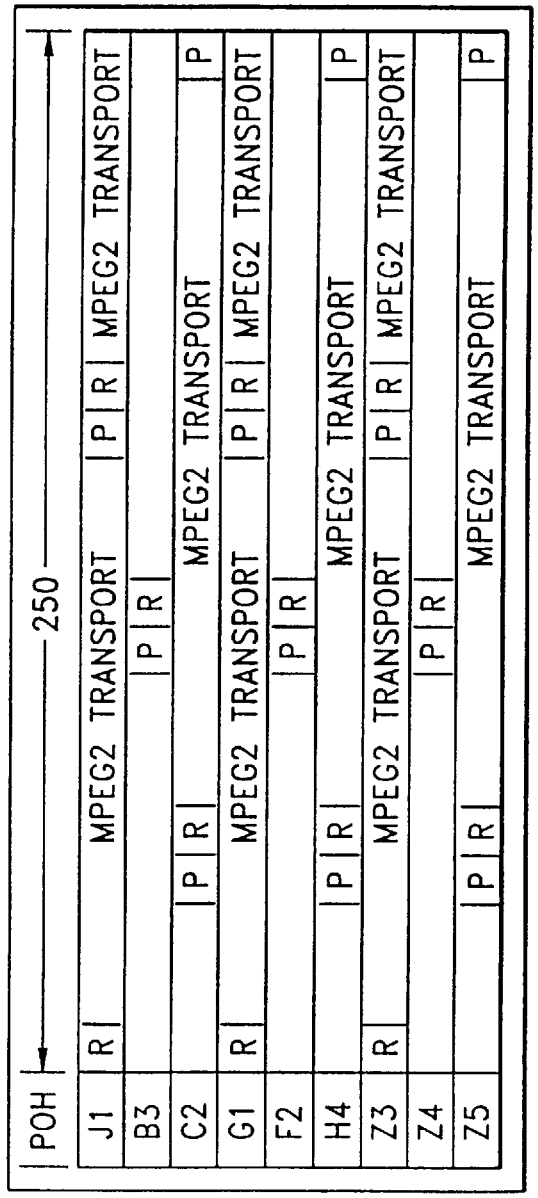
FIG. 10 graphically illustrates the Synchronous Payload Envelope (SPE) structure used for transmitting MPEG-2 transport packets in accordance with the UNISON-1 STS-3c frame structure.

The payload is contained in the SPE as illustrated in FIG. 10, which is a 125 msec frame structure. The illustrated UNISON-1 STS-3c SPE consists of 261 columns and 9 rows of bytes, for a total 2349 bytes. As shown in FIG. 10, column 1 preferably contains 9 bytes designated as STS Path Overhead (POH), while the remaining 2340 bytes are available for payload. The UNISON-1 STS-3c SPE begins in row 1, column 10 of the STS-3c frame. In a preferred embodiment, MPEG-2 transport packets are mapped into the UNISON-1 STS-3c SPE as illustrated in FIG. 10. As shown in FIG. 10, the Path Overhead consists of the following fields: B3 is a Bit-Interleaved Parity octet (BIP-8) for path error monitoring functions; C2 is allocated to indicate the construction and content of the STS SPE; H4 indicates the location of the start of the next MPEG-2 Systems transport packet envelope; and the remainder of the POH octets are currently unused. The MPEG-2 transport packets are then mapped into the UNISON-1 STS-3c payload, as shown in FIG. 10, where the SPE payload consists of reserved (R) octets (currently unused), MPEG-2 transport packets comprising 188 octet packets combining a variety of video, audio and private data into single or multiple streams for storage or transmission, and a Reed Solomon Parity bit (P) for error correction. The Reed Solomon Parity bit is preferably calculated over the preceding MPEG-2 Systems transport packet (188 octets), where the Reed Solomon code used for the parity calculation is a code which is implemented using a symbol size (M) of 8 bits and the polynomial $p(x)=x^8+x^7+x^2+x+1$ to generate a Galois Field of 256.

In order to keep emulation of frame bytes from occurring in the SPE, scrambling is employed. Preferably, a frame synchronous scrambler of sequence length 127 operating at the line rate is used. In a preferred embodiment, the generating polynomial is $1+x^6+x^7$. All bits to be scrambled are added, modulo 2, to the output from the $x^7$ position of the scrambler. Preferably, the scrambler runs continuously throughout the complete STS-3c frame illustrated in FIG. 8. However, the frame bytes and the identification bytes preferably are not scrambled.

Finally, concatenation refers to the transport condition of a SONET OC-N system where the entire SPE is treated as a single entity or contiguous data stream. When concatenation is implemented, the H1 and H2 octets are assigned predefined values. Preferably, the MPEG-2 Systems transport packets are mapped into the SPE and are then passed to the digital network 70 as a single contiguous entity.

4. Detailed I/O Card Implementation Examples

In a presently preferred embodiment of the conditional access system, the SABER 20 accepts programs over data link 40 in FDDI frames, and outputs the program with the conditional access over data link 50 in SONET-ATM frames. To maximize the data transfer rates in such a configuration, two FDDI input cards 28a, 28b are matched to a single SONET-ATM output card 26. Presented below are the implementation details for an exemplary input card 26 that implements FDDI to MPEG-2 mapping and an exemplary output card 28 that implements MPEG-2 to SONET-ATM mapping.

a. FDDI to MPEG-2 implementation details

Figure 2A:
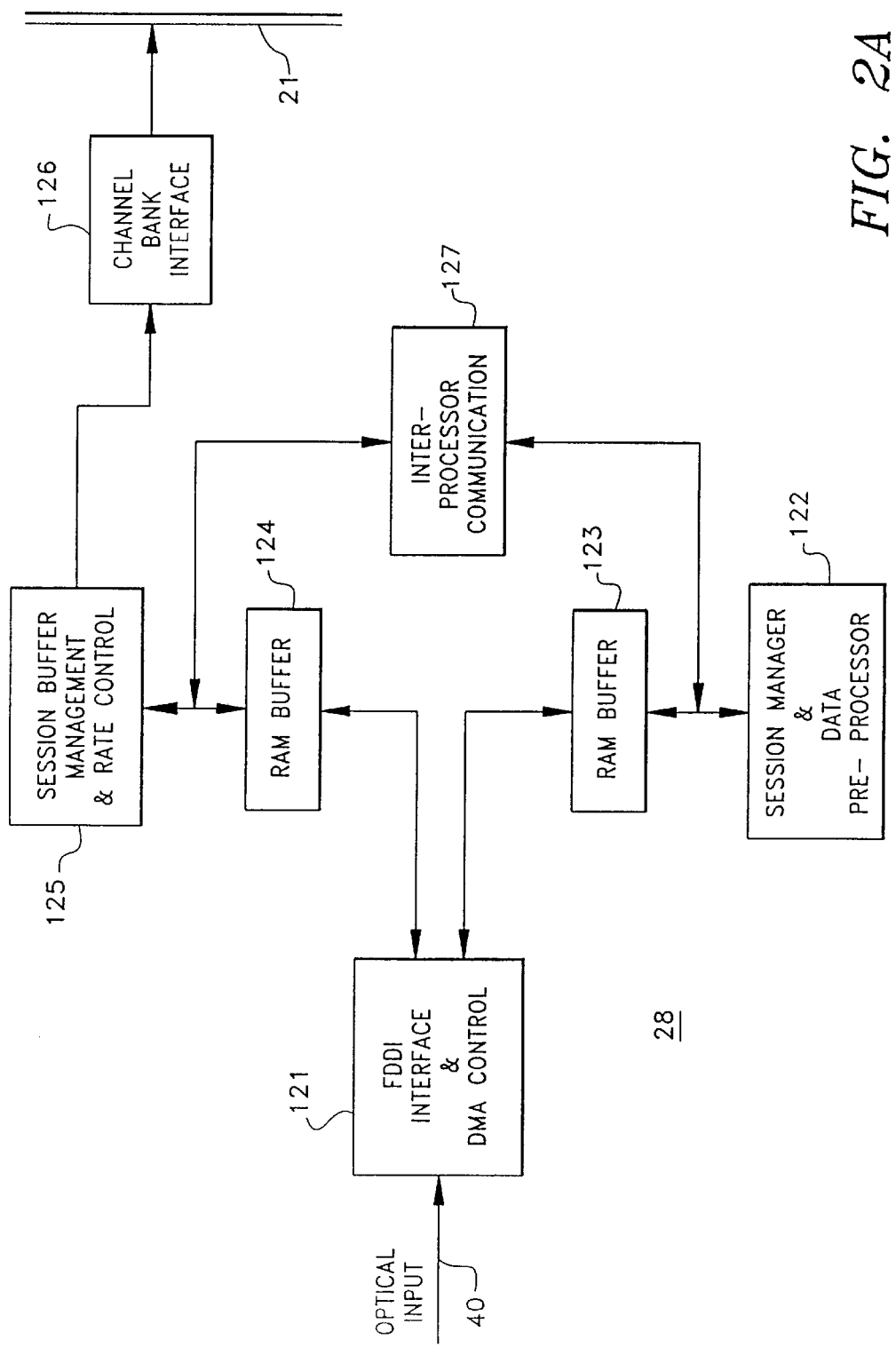
FIG. 2A is a block diagram illustrating further details of a presently preferred embodiment of an FDDI input card.

Referring to FIG. 2A, the FDDI card is capable of accepting data over an FDDI network from a maximum of 64 programs at a combined rate of 75 Mbps. Multiple FDDI cards can be inserted into the backplane 21 to achieve the combined data rate and number of sessions desired.

The FDDI frames arrive over an optical fiber interface from data link 40. The standard FDDI rate of 100 Mbps is supported, although the MPEG-2 transport packets transferred to the FDDI card arrive at a combined rate of 75 Mbps. The additional bandwidth is available for overhead frame information and communication from the FDDI card 28 to the file server 60. The FDDI frames are bufferred by the FDDI Interface and DMA control section 121, which strips away the physical layer of FDDI information and transfers the FDDI payload of MPEG-2 packets to the RAM buffer 123. The Session Manager and Data Pre-processor 122 replaces all of the PIDs on a perframe basis. Additionally, the processor 122 handles communication with the FDDI Interface and DMA control section 121 to communicate with the file server 60 to maintain the FDDI link. For example, buffer overflow or underflow conditions are monitored and communicated to the file server 60 to slow down or speed up the transfers of data as needed. Buffer levels are constantly monitored. Also, a frame sequence count is monitored to ensure synchronization between the FDDI card and the file server 60. After PIDs are re-mapped, the transport packets are transferred to buffer 124.

A Session Buffer Management and Rate Control (SBRC) section 125 keeps track of the MPEG-2 transport packets on a per session basis. The SBRC section 125 calculates the rate at which packets should be output for each session. When a packet is due for output, it is moved to the CBI 126 for output onto the backplane 21 for delivery to the control card 22 and thereafter the conditional access card 24. In addition, the SBRC section 125 corrects the timebase of the program for variable delays experienced on the FDDI input card 28. The timebase correction is outlined in the MPEG-2 Systems Standards Reference.

b. MPEG-2 to SONET-ATM implementation details

Figure 2B:
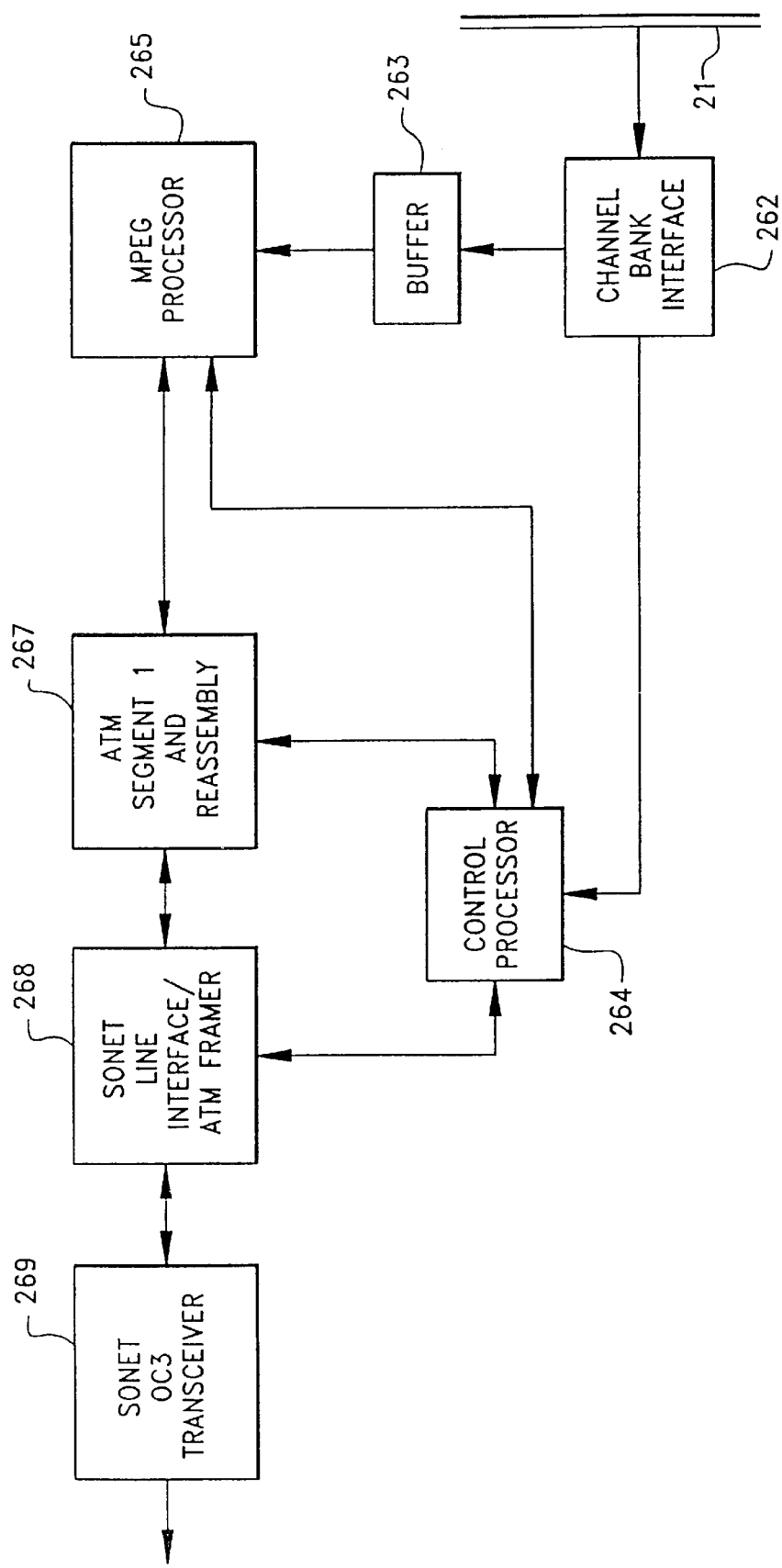
FIG. 2B is a block diagram illustrating further details of a presently preferred embodiment of a SONET-ATM output card.

An exemplary output card 26 that implements the SONET-ATM mapping is illustrated in FIG. 2B. The function of the card can be appreciated in conjunction with FIG. 5, which illustrates the mapping of MPEG-2 transport packets into ATM cells. The control processor 264 is a general purpose processor that controls the flow of information through the output card 26. The channel bank interface 262 receives MPEG-2 transport packets from the control card 22 via backplane 21. The MPEG-2 transport packets are stored in buffer 263, awaiting processing by the MPEG processor 265. The MPEG processor 265 manages the buffer 263, and passes pairs of MPEG-2 transport packets, which form an AAL 5 PDU, to the ATM segmenter and reassembler (SAR) 267. Segmentation consists of dividing the AAL 5 PDU into 48-byte blocks and adding a 5-byte header. The SAR 267 then buffers the ATM cells internally and feeds the cells as needed to the ATM framer 268.

Adaptation of the cell stream output from the SAR 267 is performed by the ATM framer 268, which envelops the ATM cells into SONET frames for output. The ATM framer 268 contains an elastic buffer for cell storage, calculates the ATM HEC byte, and stuffs null cells into the SONET frame when the SAR has no cells ready for transmission. The ATM framer 268 creates the OC-3c frame, and generates and inserts into the OC-3c data stream B1, B2, and B3 parity bytes. The SONET frames are then sent to the SONET OC-3c transceiver 269 for transmission over digital network 70. The transceiver includes an optical transmitter suited for transmitting an OC-3 signal of the intermediate reach class. The transmitter is driven by a 155.52 Mbps balanced PECL driver.

D. Control Card

Figure 2C:
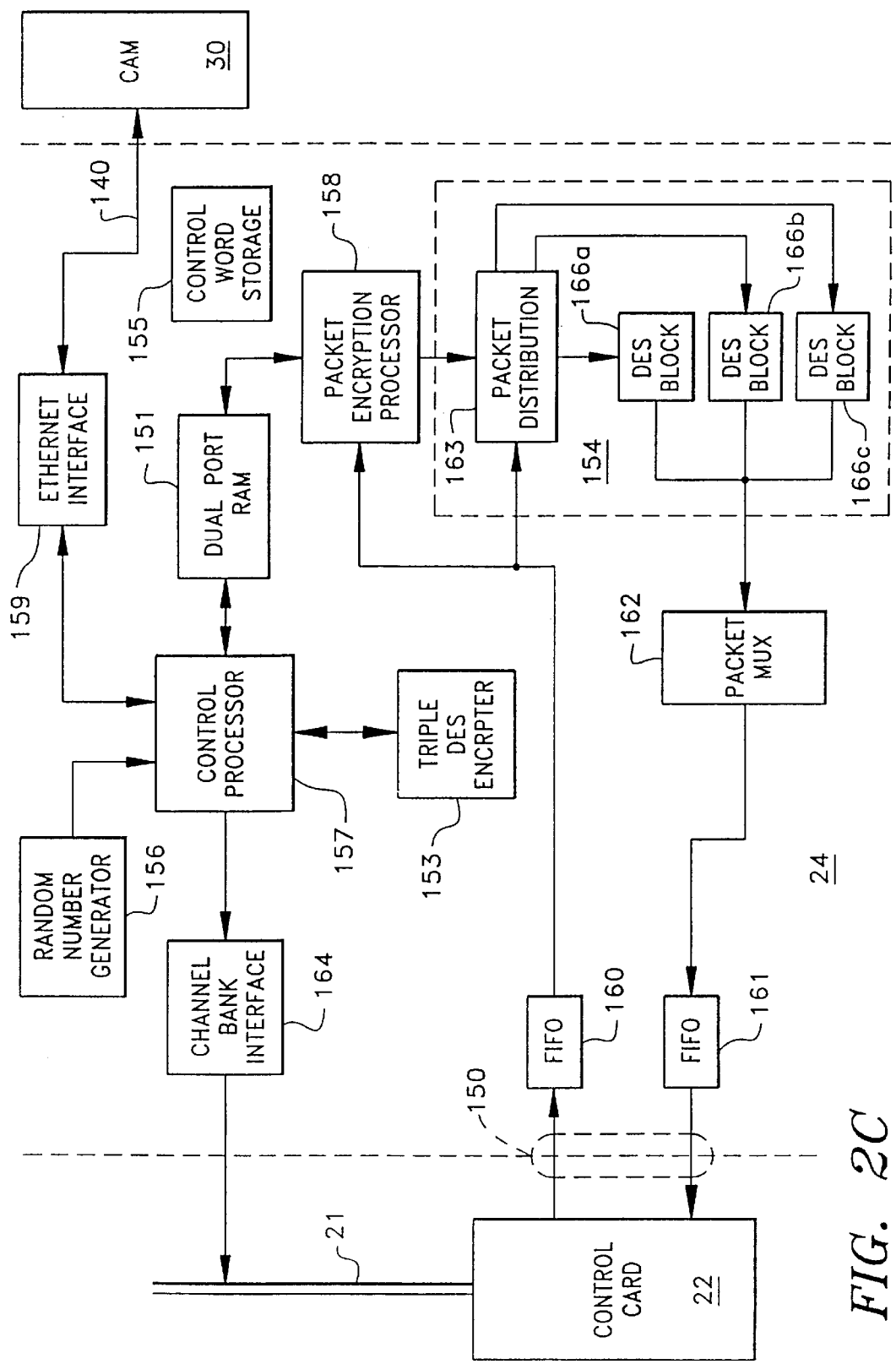
FIG. 2C is a block diagram illustrating further details of a presently preferred embodiment of a conditional access card.
Figure 2D:
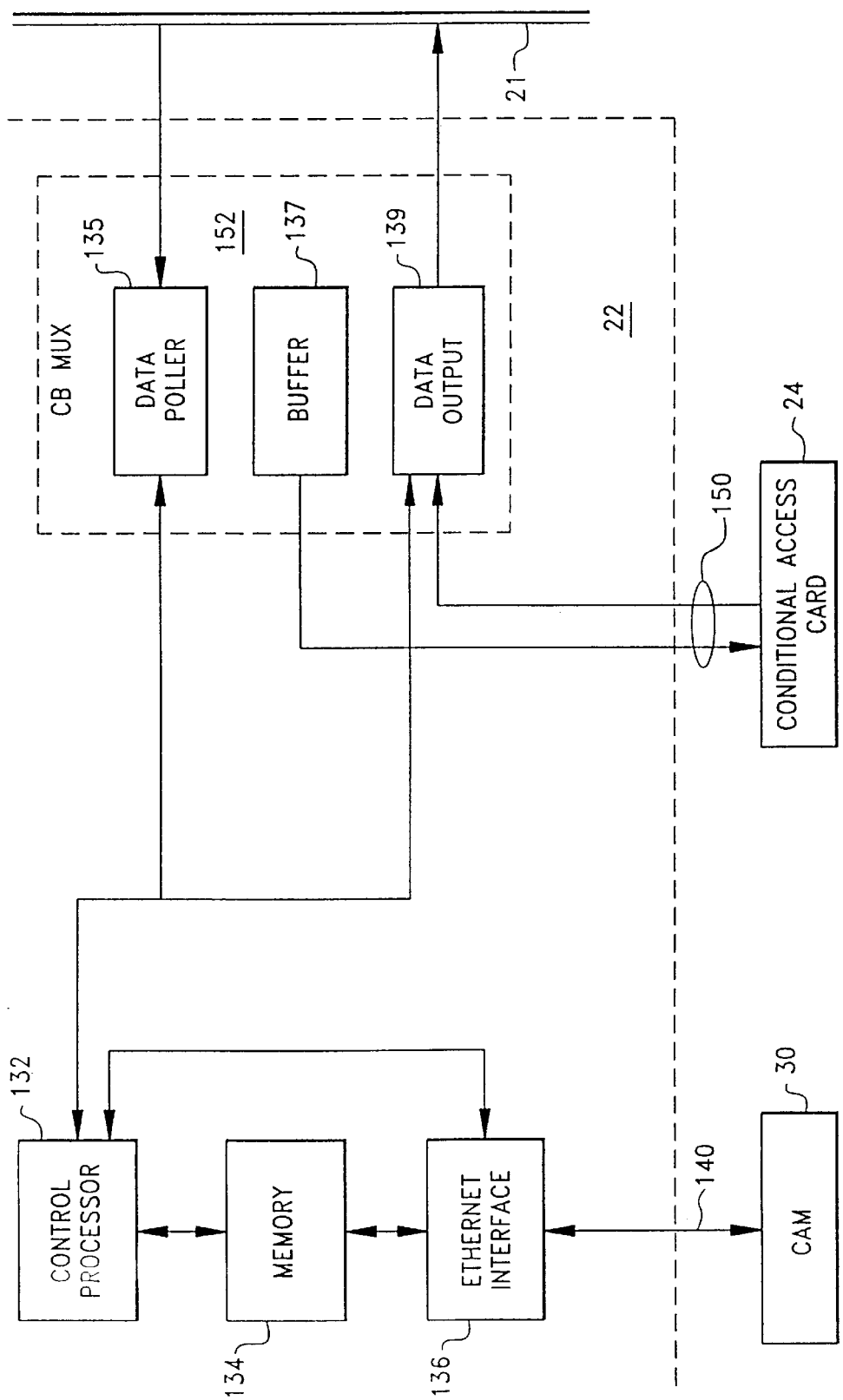
FIG. 2D is a block diagram illustrating the operation of the control card.

FIG. 2D is a functional block diagram of the operation of the control card 22. The control card 22 accepts transport packets from the backplane 21 through the CBMUX 152. The CBMUX 152 polls the input cards 28 via the backplane 21 for available packets. When multiple input cards 28 are plugged into the SABER 20, the CBMUX 152 multiplexes the MPEG-2 transport packets into a single stream by polling each input card 28 successively. After a packet is retrieved from an input card 28 by the data poller 135, the packet is transferred to buffer 137, where it waits to be transferred to the conditional access card 24. MPEG-2 transport packets are then transferred via interface 150 to the conditional access card 24, where the packets are selectively encrypted as described in detail below. After the conditional access card 24 has completed its functions, the MPEG-2 transport packets are transferred back to the control card 22 via interface 150 and accepted by the data output block 139. When the SABER 20 is configured with two input cards 28a and 28b, the control card 22 multiplexes MPEG-2 transport packets from the respective cards together before delivering them to the conditional access card 24. The control card 22 receives provisioning information from the CAM 30 over the ethernet data link 140. The ethernet interface 136 moves the provisioned information into memory for access by the control processor 132.

The control card 22 multiplexes the MPEG-2 transport packets of one or more programs, including transport packets containing EMMs generated by the CAM 30 and ECMs generated by the conditional access card 24 in accordance with the MPEG-2 Systems Standards Reference (ISO 13818-1). When instructed by the control processor 132, the CBMUX 152 outputs an MPEG-2 transport packet from the data output buffer 139 to the output card 26. The output card 26 then appropriately formats the data for output from the SABER 20.

E. Conditional Access Card

Conditional access is provided through the cooperation of three separate components: the conditional access manager (CAM) 30, the control card 22 and the conditional access card 24. These three components implement the improved three layer encryption scheme of the present invention for providing conditional access to the MPEG-2 transport packets of particular programs, which has been described in detail above. Data flow between the components is illustrated by reference to FIGS. 2 and 2C.

Non-encrypted MPEG-2 transport packets that have been removed from the network protocol in which they were received from data link 40 are transferred from the input card 28 to the control card 22 via the backplane 21. The packets are then transferred from the control card 22 to the conditional access card 24 via link 150 for encryption. Periodically, the CAM 30 provides the conditional access card 24 with an MSK used to encrypt the control words of the first level of encryption. After the conditional access card 24 encrypts the MPEG-2 transport packets using the frequently changing control words, it transfers the packets back to the control card 22 via data link 150. The control card 22 multiplexes these transport packets, along with other transport packets, to form an outgoing transport stream for transmission to an STU 90.

The encryption model of the present invention is illustrated in FIG. 3. That model was described in detail above. According to a preferred embodiment of the present invention, the conditional access card 24 implements the first two of the three encryption layers and the last layer is provided by the CAM 30. At the first layer, the non-encrypted transport packets enter the program encrypter 154 through data path 150. A control word (i.e., key) is provided by a random number generator 156 located on the conditional access card 24. In particular, the random number generator 156 provides a seed to the controller 157 which generates control words used to encrypt the transport packets. The random number generator 156 is implemented using a dedicated hardware device such as the NM 810 random number generator card from Newbridge Microsystems. According to the presently preferred embodiment, the program encrypter 154 uses the well-know Data Encryption Standard (DES) algorithm to encrypt the programs. To increase the robustness of the encryption algorithm against attack, the control words are changed often (e.g., every few seconds). Moreover, because the entire program must be encrypted in real-time, the encryption algorithm is implemented in hardware.

The control words are encrypted using the MSK received from the CAM 30. The data rates of the control words relative to the program information are relatively low. Therefore, more exhaustive encryption can be done to ensure the security of the control word encryption against attack. These control words are encrypted using Triple-DES. Because more time is available to encrypt the control words, the encryption algorithm is implemented in firmware.

FIG. 2C illustrates a block diagram of the internal operation of the conditional access card 24. The MPEG-2 transport packets arrive from the control card 22 over data link 150 and are bufferred in FIFO 160. The packets then travel to the packet distribution logic 163. The packet encryption processor 158 performs the control word look up on a per-packet basis and is implemented using an AM29030 RISC processor. Specifically, processor 158 retrieves a control word that corresponds to the PID of the packet to be encrypted. The control word is transferred to the packet distribution logic 163, which distributes packets and control words to the DES blocks 166.

Each DES block 166 receives an entire packet, determines if the packet is to be encrypted and, if so, breaks the packet into 8 byte blocks and sends the blocks to a VM009 VLSI DES chip for encryption of the MPEG-2 payload 230 (see FIG. 4). After encryption, the three packets are re-multiplexed by the packet re-multiplexing logic 162, which ensures that the packets are output in the same order that they arrived. From the packet re-multiplexing logic 162, the FIFO 161 buffers packets for transmission back to the control card 22 for output onto the backplane 21.

A control processor 157, in cooperation with the random number generator 156, generates control words, assigns the control words to the PIDs of packets to be encrypted, and places them into the dual port RAM 151 for use by the packet encryption processor 158. The CAM 30 provides the control processor 157 over the ethernet interface 159 with information, such as the identity of PIDs that should be encrypted and updated MSKs. The control processor communicates this information to the packet encryption processor 158 via dual port RAM 151 so that the processor 158 can selectively control the encryption of program bearing transport packets. In addition, the control processor 157 in conjunction with the Triple-DES encrypter 153 encrypts the control words with the current MSK. The Triple-DES encrypter 153 comprises a VLSI VM007 encrypter chip that implements the Triple-DES encryption algorithm. The message authentication function (i.e., MD5 hashing) described in detail above is implemented by the Control Processor 157.

The encrypted control words are sent to the CBI 164 where they are inserted in MPEG-2 transport packets, assigned a unique PID, and transmitted over the backplane to be multiplexed into the stream of transport packets by the control card 22. The MSK is also encrypted and inserted in MPEG-2 transport packets. These transport packets are generated by the CAM 30 but are also routed through the CBI 164 of the conditional access card 24 for output onto the backplane 21. All the transport packets are multiplexed by the control card 22 to form a single outgoing transport stream.

V. Conditional Access Manager

Figure 12:
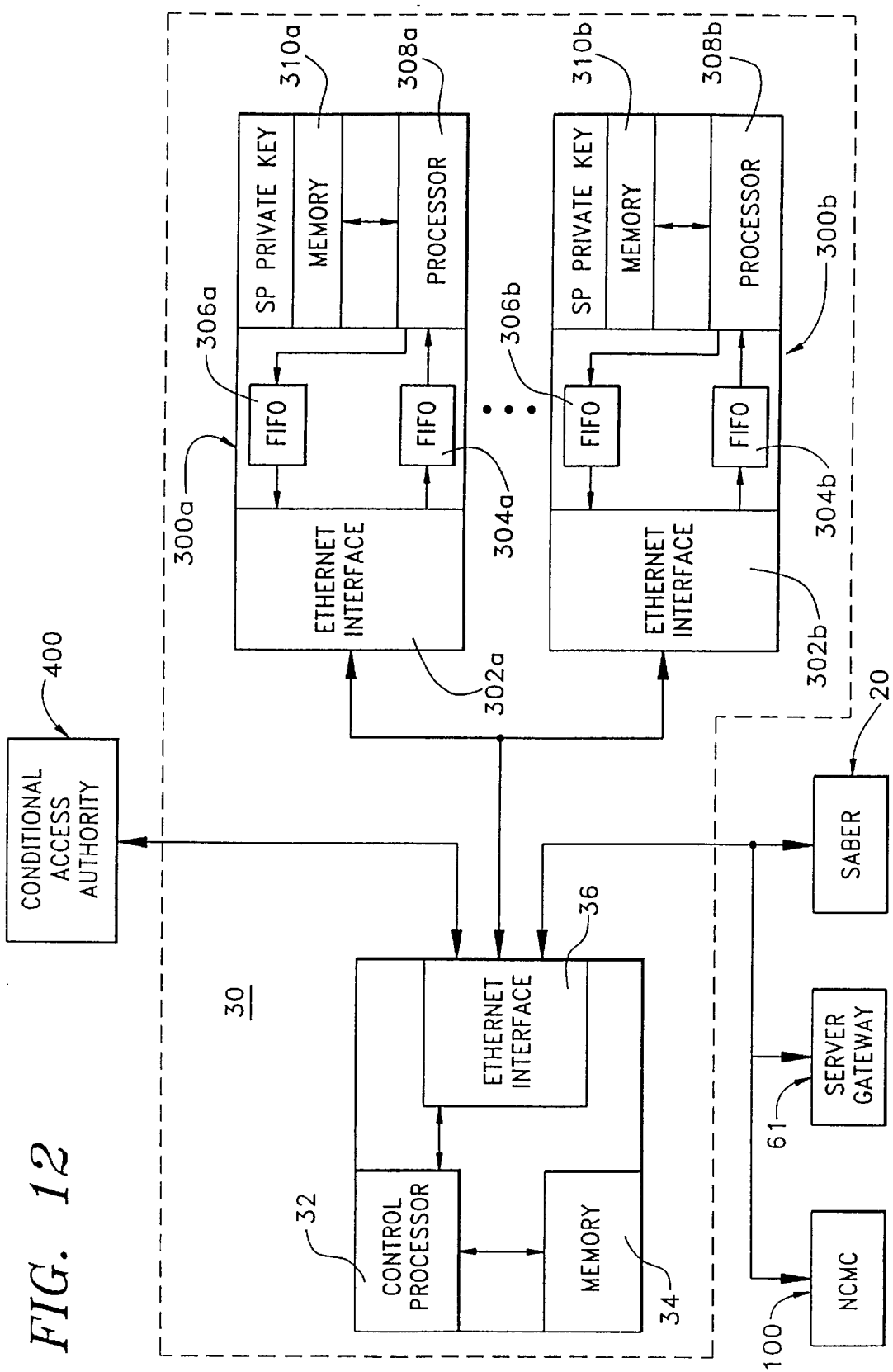
FIG. 12 is a functional block diagram illustrating the context and operation of the Conditional Access Manager.

The CAM 30 acts as the master controller of the conditional access system. It provides the connections to a variety of external components to determine all the information necessary to set-up an environment for applying conditional access. A functional block diagram of the CAM 30 in the context of the various external components is provided in FIG. 12. As illustrated, the CAM 30 communicates with the server gateways 61 to coordinate PID assignments and to receive information concerning program conditional access requirements. Additionally, the CAM 30 communicates with the SABER 20 to provide provisioning information, such as PID re-mapping tables, and to communicate conditional access information to the STUs 90. The CAM 30 communicates with a conditional access authority 400 (i.e., a public key server) to get the public keys of the STUs 90 and the SPs 110.

The third level of encryption, as explained in detail above, is performed by the CAM 30. This third level is implemented using a public-key encryption algorithm. In the present embodiment all interfaces from the CAM 30 and the external components are through ethernet. However, this is merely an example and is not intended to be limiting. Any suitable interface to external components can be employed that achieves similar results. For example, a dial-up connection can provide the required link between the CAM 30 and the conditional access authority 400. A small computer systems interface can provide the connection to more proximate devices, such as the transaction encryption device 300.

The CAM 30 consists of a control processor 32 and memory 34 for program-related storage. Most of the functions of the CAM 30 are implemented in software. Initially, the CAM 30 is in communication with the server gateways 61, via an ethernet connection. When a server gateway 61 has received a request for a program from a customer and has received authorization for connection bandwidth from the NCMC 100, the SP 110 prepares to transmit program bearing MPEG-2 transport packets to the requesting STU 90 over the distribution system 10. In so preparing, the server gateway 61 communicates with the CAM 30 and relates information, such as which PIDs are assigned to the program and whether conditional access should be applied. After receiving the request, the CAM 30 informs the SABER 20 of the PID re-mapping and conditional access requirements of the program. The CAM 30 also provides the SABER 20 with the current MSK to be used in providing conditional access to a program. In addition to sending the MSK to the SABER 20, the CAM 30 must send the MSK to authorized STUs 90. The CAM 30 also performs the digital signature function described above.

To perform the encryption services, the CAM 30 includes a transaction encryption device (TED) 300 that has secured within it the private key of the SP. The CAM 30 then provides the TED 300 with the MSK. The TED 300 encrypts the MSK with the appropriate STU 90 public key and signs the hash of the MSK message with its SP private key, according to the process described in detail above and illustrated in FIG. 3B. The MSK and signed hash are then returned to the CAM 30 where it is embedded in an EMM for transmission to the STU 90 via the SABER 20.

In addition to sharing STUs 90, multiple SPs 110 may share a single conditional access apparatus (i.e., SABER 20 and CAM 30). Applicants have recognized that security risks are presented by such sharing. For example and as described above, as part of the conditional access system, SPs 110 must sign the message hash with a digital signature to prevent unauthorized access to the STUs 90. This is accomplished by encrypting the hash with the private key of the SP 110, which corresponds to its public key that has been provided to the STUs 90.

According to a preferred embodiment of the present invention, in such a shared configuration, the CAM 30 acts as a clearinghouse for all SPs 110. The CAM 30 authorizes the SPs 110 via the server gateway 61 and then the CAM 30 digitally signs all messages on behalf of the SPs 110. Accordingly, the message from the SP 110 to the CAM 30 will be hashed and signed according to a digital signature technique, similar to that illustrated in FIG. 3B. The CAM 30 will check the SP 110 signature against a corresponding public key, which the CAM 30 receives from the conditional access authority 400. If the digital signature is authentic, the connection to the STU 90 will be allowed. In transmitting MSKs to the STU 90 via an EMM, the EMM is hashed and signed with the digital signature of the CAM 30. The STU 90 will recognize this digital signature as authentic according to the method described above for the SP 110 to STU 90 digital signature. This system will allow multiple SPs 110 to share a single CAM 30 and SABER 20 by sharing a single private key. However, in such a system, the STUs 90 are unable to distinguish between SPs 110. In an environment where it is desirable for the STUs 90 to distinguish among SPs 110 a different system is necessary.

According to another aspect of the present invention, multiple SPs 110 can share a single CAM 30 and SABER 20 combination by each employing a separate TED 300. In such an environment, the CAM 30 communicates with the TED 300 of each SP 110 to encrypt and sign MSKs for delivery to the STUs 90. The SPs 110 can then each provide a separate public key/private key pair. In such a system, measures are taken to ensure that the private key of each SP 110 is adequately protected from discovery. Then each request by a SP 110 via a corresponding server gateway 61 would result in all encryption for that SP 110 being directed to its own TED 300. Thus, multiple SPs 110 can share a single CAM 30 and SABER 20 and the STUs 90 will still be able to distinguish between SPs 110.

Each STU 90 has a public key/private key pair. The private key is secured within the STU 90 in a secure processor. The associated public key is then published in a public key database server maintained by a conditional access authority 400. When an SP 110 wishes to provide conditional access to its programming for a particular STU 90, the CAM 30 looks up the public key for the STU 90 and sends the MSK to the STU 90 encrypted with the public key of that STU 90. The STU 90 can then decrypt the MSK using its corresponding private key. The CAM 30 maintains a data base of valid STU 90 public keys, which it periodically updates from the conditional access authority 400.

VI. An exemplary Set Top Unit (STU)

Figure 11:
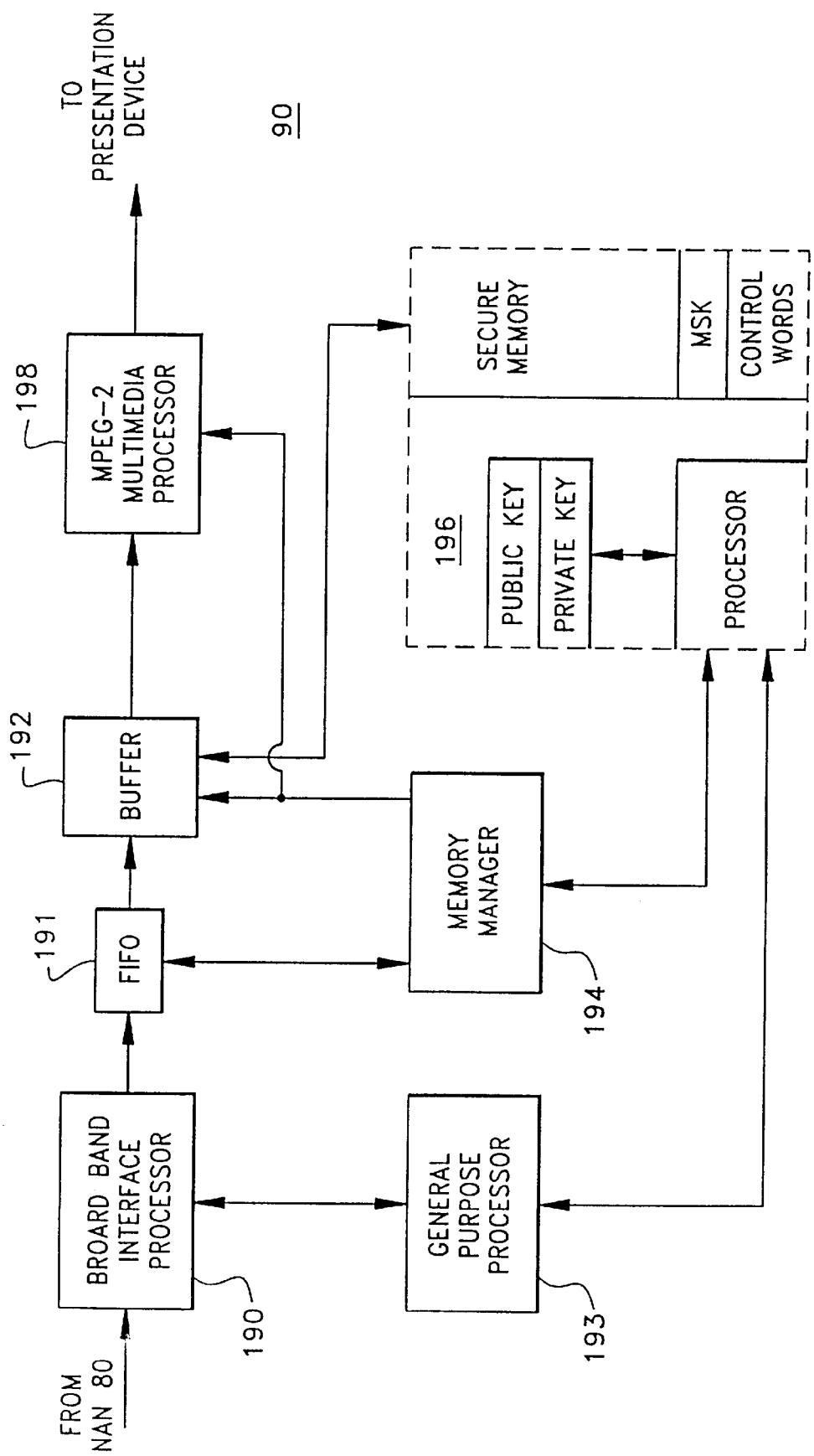
FIG. 11 illustrates a functional block diagram of an exemplary set top unit implementing the conditional access method of the present invention.

FIG. 11 is a functional block diagram of an exemplary STU 90. After a NAN 80 removes the MPEG-2 packets from the network protocol of the digital network 70, raw MPEG-2 transport packets are transmitted to the STU 90. The STU 90 receives the packets through its broadband interface processor 190, which negotiates the delivery of packets from the NAN 80. The broadband interface processor 190 receives instructions from the general purpose processor 193 about which packets to de-multiplex from the MPEG-2 transport packet stream. These instructions include information related to the ECMs associated with the program bearing MPEG-2 transport packets. The broadband interface processor 190 passes the associated ECMs to the secure processor 196 which performs the Triple-DES decryption of the control words carried in the ECMS and verifies that the STU 90 is authorized for the requested program service. The secure processor 196 then passes the decrypted control words back to the broadband interface processor 190 which uses them to decrypt the program.

The secure processor 196 also performs the decryption of the MSKs carried in EMMs. The secure processor 196 contains the private key that corresponds to the public key of the STU 90, which the SP 110 used to encrypt the EMMs as described in detail above. Additionally, the secure processor 196 has access to the public keys of authorized SPs 110 which are contained in buffer 192. Thus, the secure processor 196 implements the reverse of the third level of encryption described in detail above and provides EMM authentication by verifying the digital signature of the EMM.

After the program bearing MPEG-2 transport packets are decrypted by the broadband interface processor 190, the packets are output to FIFO 191. The memory manager 194 then moves the packets to buffer 192 for access by the MPEG-2 multimedia processor 198. The transport packets are processed by the MPEG-2 multimedia processor 198 for playback on a presentation device (not shown). The presentation device may be any appropriate device, such as a television or a personal computer.

As the foregoing illustrates, the present invention is directed to a method and apparatus for adding conditional access in connection-oriented, interactive networks with a multiplicity of service providers. It is understood, however, that changes may be made to the embodiments described above without departing from the broad inventive concepts thereof. For example, while the present invention is described in the context of an interactive system, the same methods and apparatus would work effectively in a broadcast environment. Accordingly, this invention is not limited to the particular embodiments disclosed, but is intended to cover all modifications that are within the scope and spirit of the invention as defined by the appended claims.

What is claimed:

1. In an interactive information services system for providing at least one of video, audio, and data (program) requested by a customer from a service provider (SP) and for transmitting the requested program in program bearing packets to a set top unit (STU) associated with the customer, apparatus positioned between the SP and the STU associated with the customer, apparatus positioned between the SP and the STU for ensuring that only the customer has access to said program, said apparatus comprising:

means for receiving program bearing packets in a first network protocol from a first data link and removing said packets from said first network protocol;

means for adding conditional access to said program bearing packets, said means for applying conditional access comprising:

means for selecting program bearing packet comprising a program requested by the customer;

means for encrypting said selected program bearing packets according to a first encryption algorithm using a first key;

means for encrypting said first key according to a second encryption algorithm using a second key;

means for providing the encrypted said first key to the customer;

means for encrypting said second key according to a public-key encryption algorithm using a public key corresponding to a private key stored within the STU associated with the customer;

means for providing the encrypted said second key to the customer; and, means for hashing a concatenation of said first key and said second key according to a hashing function to produce an authentication code from which the STU can determine the authenticity of said first key; and, means for re-encapsulating said program bearing packets in a second network protocol and outputting said program bearing packets over a second data link.

2. An apparatus as recited in claim 1, wherein said second network protocol comprises one of said first network protocol and a third network protocol.

3. An apparatus as recited in claim 1, wherein said means for receiving program bearing packets comprises:

a receiver for receiving program bearing packets from said first data link;

a buffer for storing the received program bearing packets in said first network protocol; and, a processor for removing said program bearing packets from said first network protocol in accordance with a protocol mapping function.

4. An apparatus as recited in claim 1, wherein said means for re-encapsulating said program bearing packets comprises:

a processor for mapping said program bearing packets to said second network protocol in accordance with a protocol mapping function;

a buffer for storing a portion of said program bearing packets in said second network protocol; and, a transmitter for outputting said program bearing packets over said second data link.

5. An apparatus as recited in claim 1 further comprising a means for acquiring said public-key from a public-key database maintained by a conditional access authority.

6. An apparatus as recited in claim 1, wherein said means for encrypting said selected program bearing packets comprises at least one processor implementing a DES encryption algorithm.

7. An apparatus as recited in claim 1, wherein said means for encrypting said first key comprises at least one processor implementing a Triple-DES encryption algorithm.

8. An apparatus as recited in claim 1, wherein said means for encrypting said second key comprises a processor implementing an RSA algorithm.

9. An apparatus as recited in claim 1, wherein said means for hashing comprises a processor implementing a Message Digest 5 hashing function.

10. An apparatus as recited in claim 1, wherein said means for applying conditional access further comprises means for providing a digital signature based on said second key encrypted with a private key corresponding to a public key associated with said SP, the STU using the digital signature to verify the source of said second key.

11. An apparatus as recited in claim 10, wherein said means for providing a digital signature comprises a processor implementing an RSA algorithm.

12. An apparatus as recited in claim 10, wherein said public key and the corresponding private key are associated with a plurality of SPs.

13. An apparatus as recited in claim 1, wherein said first network protocol comprises one of fiber distributed data interface (FDDI), synchronous optical network-asynchronous transfer mode (SONET-ATM), unidirectional synchronous optical network (UNISON-1), and DS-3.

14. An apparatus as recited in claim 1, wherein said second network protocol comprises one of fiber distributed data interface (FDDI), synchronous optical network-asynchronous transfer mode (SONET-ATM), unidirectional synchronous optical network (UNISON-1), and DS-3.

15. In an interactive information services system for providing at least one of video, audio, and data (program) requested by a customer from a service provider (SP) and for transmitting the requested program in program bearing packets to a set top unit (STU) associated with the customer, apparatus positioned between the SP and the STU for ensuring that only the customer has access to said program, said apparatus comprising:

means for receiving program bearing packets in a first network protocol from a first data link and removing said packets from said first network protocol;
   means for adding conditional access to said program bearing packets;
   said means for applying conditional access comprising:
      means for selecting program bearing packets comprising a program requested by the customer;
      means for encrypting said selected program bearing packets according to a first encryption algorithm using a first key;
      means for encrypting said first key according to a second encryption algorithm using a second key;
      means for hashing a concatenation of said first key and said second key according to a hashing function to produce an authentication code from which the STU can determine the authenticity of said first key;
      means for providing the encrypted said first key and the hash of said first key concatenated with said second key to the customer;
      means for encrypting said second key according to a third encryption algorithm using a third key corresponding to a private key stored within the STU associated with the customer;
      means for providing a digital signature based on said second key, the STU using the digital signature to verify the source of said second key;
      means for providing the encrypted said second key and the digital signature to the customer; and
      means for re-encapsulating said program bearing packets in a second network protocol and outputting said program bearing packets over a second data link.

16. An apparatus as recited in claim 15, wherein said means for encrypting said selected program bearing packets comprises at least one processor implementing a DES encryption algorithm.

17. An apparatus as recited in claim 15 wherein said means for encrypting said first key comprises at least one processor implementing a Triple-DES encryption algorithm.

18. An apparatus as recited in claim 15, wherein said means for hashing comprises a processor implementing a Message Digest 5 hashing function.

19. An apparatus as recited in claim 15, wherein said third encryption algorithm comprises a public-key encryption algorithm and further wherein said third key comprises a public-key corresponding to said private key 5 stored within the STU.

20. An apparatus as recited in claim 19, wherein said means for encrypting said second key comprises a processor implementing an RSA algorithm.

21. An apparatus as recited in claim 15, wherein said means for providing a digital signature comprises a processor implementing an RSA algorithm.

22. An apparatus as recited in claim 15, wherein said second network protocol comprises one of said first network protocol and a third network protocol.

23. An apparatus as recited in claim 15, wherein said means for receiving program bearing packets comprises:

a receiver for receiving program bearing packets from said first data link;
   a buffer for storing the received program bearing packets in said first network protocol; and,
   a processor for removing said program bearing packets from said first network protocol in accordance with a protocol mapping function.

24. An apparatus as recited in claim 15, wherein said means for re-encapsulating said program bearing packets comprises:

a processor for mapping said program bearing packets to said second network protocol in accordance with a protocol mapping function;
   a buffer for storing a portion of said program bearing packets in said second network protocol; and,
   a transmitter for outputting said program bearing packets over said second data link.

25. An apparatus as recited in claim 15, wherein said first network protocol comprises one of fiber distributed data interface (FDDI), synchronous optical network-asynchronous transfer mode (SONET-ATM), unidirectional synchronous optical network (UNISON-1), and DS-3.

26. An apparatus as recited in claim 15, wherein said second network protocol comprises one of fiber distributed data interface (FDDI), synchronous optical network-asynchronous transfer mode (SONET-ATM), unidirectional synchronous optical network (UNISON-1), and DS-3.

27. In a digital video delivery system, wherein a plurality of programs are stored at a service provider (SP) in a transport packet format and delivered in a first protocol format to a network for delivery to a subscriber, a method for linking the SP to the network and applying conditional access to the transport packets comprising:

selecting program bearing packets comprising a program requested by the customer;
   encrypting said selected program bearing packets according to a first encryption algorithm using a first key;
   encrypting said first key according to a second encryption algorithm using a second key;
   providing the encrypted said first key to the customer;
   encrypting said second key according to a public-key encryption algorithm using a public key corresponding to a private key stored within a set top unit (STU) associated with the customer;
   providing the encrypted said second key to the customer; and
   wherein applying conditional access further comprises the step of hashing a concatenation of said first key and said second key according to a hashing function to produce an authentication code from which the STU can determine the authenticity of said first key.

28. A method as recited in claim 27 further comprising the step of acquiring said public-key from a public-key database maintained by a conditional access authority.

29. A method as recited in claim 27, wherein said step of encrypting said selected program bearing packets comprises a DES encryption algorithm.

30. A method as recited in claim 27, wherein said step of encrypting said first key comprises a Triple-DES encryption algorithm.

31. A method as recited in claim 27, wherein said step of encrypting said second key comprises an RSA algorithm.

32. A method as recited in claim 27, wherein said step of hashing comprises a Message Digest 5 hashing function.

33. A method as recited in claim 27, wherein said step of applying conditional access further comprises the step of providing a digital signature based on said second key encrypted with a private key corresponding to a public key associated with said SP, the STU using the digital signature to verify the source of said second key.

34. A method as recited in claim 33, wherein said step of providing a digital signature comprises an RSA algorithm.

35. A method as recited in claim 33, wherein said public key and the corresponding private key are associated with a plurality of SPs.

36. In a digital information delivery system wherein a plurality of programs are stored in a transport packet format and are delivered to a network for transmission to an authorized customer, a method for applying conditional access to the transport packets comprising the steps of:
(a) selecting packets comprising a program requested by an authorized customer;
(b) encrypting the program bearing transport packets according to a first encryption algorithm using a first key;
(c) outputting the encrypted transport packets for delivery to the authorized customer over the network;
(d) encrypting said first key according to a second encryption algorithm using a second key;
(e) generating a message authentication code comprising a hash of the concatenation of said first key and said second key according to a hashing function;
(f) providing the encrypted said first key and said message authentication code to the authorized customer over the network;
(g) encrypting said second key according to a third encryption algorithm using a third key;
(h) applying a digital signature to the encrypted said second key, the authorized customer using the digital signature to verify the origin of the encrypted said second key; and,
(I) providing the encrypted and digitally signed said second key to the authorized customer over the network.

37. A method as recited in claim 36, wherein the packets are encrypted according to a DES algorithm.

38. A method as recited in claim 36, wherein the first key is encrypted according to a Triple-DES algorithm.

39. A method as recited in claim 36, wherein the second key is encrypted according to a public-key cryptographic technique.

40. A method as recited in claim 39, wherein the public-key cryptographic technique implements an RSA algorithm.

41. A method as recited in claim 36, wherein the hashing function comprises a Message Digest 5 function.

42. A method as recited in claim 36, wherein step (h) further comprises the steps of:
(I) hashing a message that is comprised of the second key;
(ii) encrypting the hash message with a public-key encryption algorithm using a private key associated with the SP, wherein the private key has a corresponding public key that is provided to a set top unit (STU); and,
(iii) transmitting the encrypted hashed message to the authorized customer.

43. In a digital transmission system wherein groups of program bearing packets are transmitted over a digital network between a service provider (SP) at a transmission site and a customer having a reception site, a method of selectively providing conditional access to a program within said program bearing packets comprising the steps of:
at the transmission site:
(a) selecting packets bearing a particular program to be delivered to at least one selected customer;
(b) encrypting at least a portion of the selected packets with a first key using a first encryption algorithm;
(c) encrypting said first key with a second key using a second encryption algorithm;
(d) generating a message authentication code for the first key comprising a hash of a concatenation of said second key with said first key according to a hashing function;
(e) generating an entitlement control message comprising a concatenation of said message authentication code and said first key;
(f) generating a digital signature for said second key comprising a hash of said second key according to a hashing function and encrypting said hash of said second key with a private key associated with the SP, said private key having a public-key counterpart, in accordance with a first public key encryption algorithm;
(g) forming an entitlement management message comprising said encrypted key and said digital signature;
(h) encrypting at least a portion of said entitlement management message with a public key according to a second public-key encryption algorithm, wherein said public key is associated with said at least one selected customer;
(I) multiplexing said selected program bearing packets, said entitlement control message and said entitlement management message into said digital network for reception by said at least one customer's reception site;
at the reception site:
(j) receiving said selected program bearing packets, said entitlement control message, and said entitlement management message at said at least one customer's reception site;
(k) recovering said second key from said entitlement management message by:
decrypting said encrypted portion of said entitlement management message using a private-key corresponding to said public key associated with said at least one selected customer,
retrieving said digital signature portion and decrypting said digital signature portion with a public-key counterpart to said private key associated with the SP; retrieving said second key and hashing said second key, and
authenticating said second key when said digital signature is equivalent to said hashed second key;
(l) recovering said first key from said entitlement control message by:
decrypting said first key with said second key,
concatenating said first key and said second key,
generating a hash value by hashing said concatenated first key and said second key, and
authenticating said first key when said hash value is equivalent to said message authentication code contained in said entitlement control message; and, (m) decrypting said selected packets bearing said particular program with said first key.

44. A method as recited in claim 43 further comprising the step of, at the transmission site, acquiring the public-key corresponding to said at least one customer from a public-key database maintained by a conditional access authority.

45. A method as recited in claim 43, wherein said first encryption algorithm comprises a DES encryption algorithm.

46. A method as recited in claim 43, wherein said second encryption algorithm comprises a Triple-DES encryption algorithm.

47. A method as recited in claim 43, wherein said first and second public-key encryption algorithms comprise an RSA encryption algorithm.

48. A method as recited in claim 43, wherein said hashing function comprises a Message Digest 5 hashing function.

49. A method as recited in claim 43 further comprising the step of periodically changing said first key.

50. A method as recited in claim 43 further comprising the step of periodically changing said second key.

* * * * *